US009046044B2

(12) United States Patent
Shimada et al.

(10) Patent No.: US 9,046,044 B2
(45) Date of Patent: Jun. 2, 2015

(54) VEHICLE CONTROL APPARATUS FOR CONTROLLING THE OUTPUT REDUCTION OF A POWER SOURCE

(75) Inventors: Michihito Shimada, Mishima (JP); Yuki Minase, Susono (JP); Toshiya Oishi, Nagoya (JP); Tsutomu Miyazaki, Miyoshi (JP); Masashi Takagi, Nagoya (JP); Kenichi Okaya, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 830 days.

(21) Appl. No.: 13/143,286

(22) PCT Filed: Mar. 29, 2010

(86) PCT No.: PCT/JP2010/002274
§ 371 (c)(1),
(2), (4) Date: Jul. 5, 2011

(87) PCT Pub. No.: WO2011/121637
PCT Pub. Date: Oct. 6, 2011

(65) Prior Publication Data
US 2011/0295480 A1 Dec. 1, 2011

(51) Int. Cl.
*G06F 7/70* (2006.01)
*B60T 8/171* (2006.01)
(Continued)

(52) U.S. Cl.
CPC ............... *F02D 29/02* (2013.01); *B60K 17/35* (2013.01); *B60T 8/1755* (2013.01); *B60W 10/06* (2013.01); *B60W 10/188* (2013.01); *B60W 30/02* (2013.01); *B60W 2510/0638* (2013.01); *B60W 2510/1015* (2013.01); *B60W 2510/104* (2013.01); *B60W 2520/10* (2013.01); *B60W 2520/14* (2013.01); *B60W 2520/26* (2013.01); *B60W 2520/28* (2013.01); *B60W 2540/10* (2013.01); *B60W 2540/12* (2013.01); *B60W 2540/16* (2013.01); *B60W 2540/18* (2013.01); *B60W 2710/0666* (2013.01)

(58) Field of Classification Search
CPC ....................................................... B60T 8/171
USPC ............................................................ 701/70
See application file for complete search history.

(56) References Cited

U.S. PATENT DOCUMENTS 3,936,709 A * 2/1976 Wright ........................... 318/269
4,791,900 A * 12/1988 Buck et al. .................... 123/359
(Continued)

FOREIGN PATENT DOCUMENTS

JP 62-051737 A 3/1987
JP 11-063188 A 3/1999
(Continued)

*Primary Examiner* — James Trammell
*Assistant Examiner* — Majdi Alsomiri
(74) *Attorney, Agent, or Firm* — Sughrue Mion, PLLC

(57) ABSTRACT

Provided is a vehicle control apparatus that can prevent the deterioration of drivability. An ECU executes a reduction control when speed reduction of a vehicle is determined as a control permit condition is established, and does not execute the reduction control when the speed reduction is not determined as the condition is not established. Additionally, when determined that a vehicle behavior stabilization control that stabilizes behavior of the vehicle is being executed, the ECU determines the speed reduction of the vehicle by changing a speed reduction threshold value for determining the speed reduction. This makes it possible to adequately determine the speed reduction of the vehicle even when a drive state of the vehicle is changed by the execution of the vehicle behavior stabilization control, thereby allowing the execution and non-execution of the reduction control to be switched reflecting a driver's intention and thus preventing the drivability from being deteriorated.

18 Claims, 7 Drawing Sheets

(51) Int. Cl.
  *F02D 29/02* (2006.01)
  *B60K 17/35* (2006.01)
  *B60T 8/1755* (2006.01)
  *B60W 10/06* (2006.01)
  *B60W 10/188* (2012.01)
  *B60W 30/02* (2012.01)

(56) References Cited

U.S. PATENT DOCUMENTS

| | | | |
|---|---|---|---|
| 5,913,377 A * | 6/1999 | Ota et al. | 180/244 |
| 5,951,438 A | 9/1999 | Adachi et al. | |
| 6,278,916 B1 * | 8/2001 | Crombez | 701/22 |
| 2002/0165651 A1 * | 11/2002 | Hesse et al. | 701/37 |
| 2004/0127333 A1 * | 7/2004 | McCall | 477/206 |
| 2006/0037802 A1 * | 2/2006 | Mori | 180/233 |
| 2009/0062987 A1 * | 3/2009 | Kim et al. | 701/41 |

FOREIGN PATENT DOCUMENTS

| | | |
|---|---|---|
| JP | 2006-233870 A | 9/2006 |
| JP | 2007-120382 A | 5/2007 |

* cited by examiner

FIG.5

|   |     | C1 | C2 | B1 | B2 | B3 | F |
|---|-----|----|----|----|----|----|---|
|   | P   | ×  | ×  | ×  | ×  | ×  | × |
|   | R   | ×  | ×  | ×  | ○  | ○  | × |
|   | N   | ×  | ×  | ×  | ×  | ×  | × |
| D | 1st | ○  | ×  | ×  | ◎  | ×  | △ |
|   | 2nd | ○  | ×  | ○  | ×  | ×  | × |
|   | 3rd | ○  | ×  | ×  | ×  | ○  | × |
|   | 4th | ○  | ○  | ×  | ×  | ×  | × |
|   | 5th | ×  | ○  | ×  | ×  | ○  | × |
|   | 6th | ×  | ○  | ○  | ×  | ×  | × |

○ ENGAGED  × DISENGAGED
◎ ENGAGED IN ENGINE BRAKE ONLY
△ ENGAGED IN START DRIVING ONLY

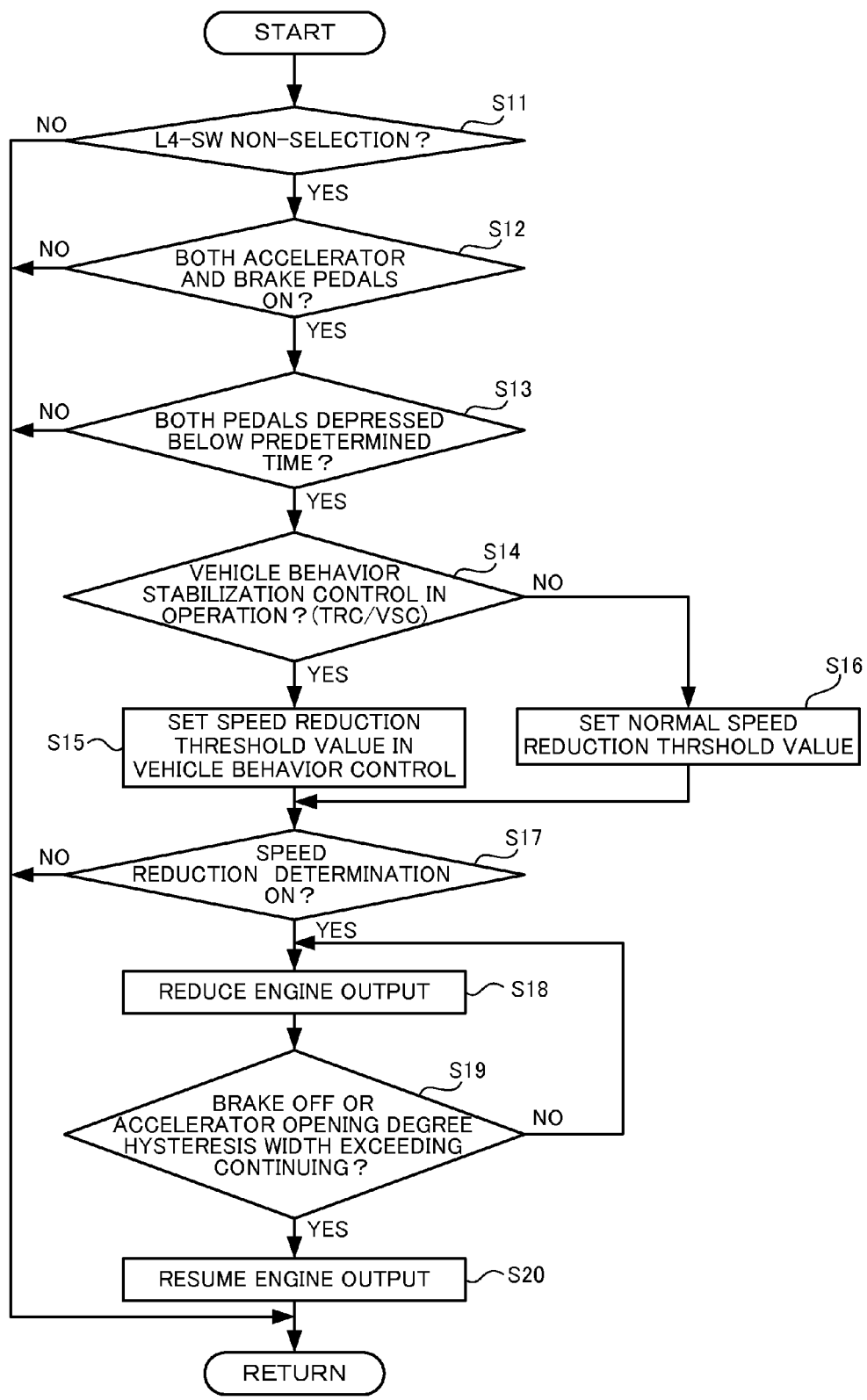

VEHICLE CONTROL APPARATUS FOR CONTROLLING THE OUTPUT REDUCTION OF A POWER SOURCE

CROSS REFERENCE TO RELATED APPLICATION

This application is a National Stage of International Application No. PCT/JP2010/002274 filed Mar. 29, 2010, the contents of all of which are incorporated herein by reference in their entirety.

BACKGROUND OF THE INVENTION

1. Field of the Invention

The present invention relates to a vehicle control apparatus, and more particularly to a vehicle control apparatus for controlling the output reduction of a power source.

2. Related Art

In general, a vehicle has three basic and necessary abilities including an ability to advance as a driving force, an ability to turn as a steering force, and an ability to stop as a braking force.

The driving force is obtained as a reaction force to the frictional force between driving wheels and a road surface by generating a power, i.e., a torque, from a power source of an internal combustion engine (hereinafter simply referred to as an engine) in response to the depression amount of an accelerator pedal or the like and transmitting the generated torque through a transmission to the driving wheels to allow the driving wheels to travel thereon. The steering force is obtained by a steering device capable of changing the advancing direction of, for example, front wheels in response to the operation amount of a steering wheel. The braking force is obtained as a reaction force by generating a frictional force in the advancing direction between the driving wheels and the road surface by slowing down or stopping the rotation of the wheels in response to the depression amount of a brake pedal or the like to allow the vehicle to be stopped.

Generally, the accelerator pedal and the brake pedal are located adjacent to each other close to the location of driver's feet. Many drivers depress selectively the accelerator pedal or the brake pedal only with his/her right foot to control the driving force and the braking force, viz., to control a vehicle speed.

In this case, a vehicle with an automatic transmission (hereinafter simply referred to as an AT car) is provided with no clutch pedal. This causes some drivers to depress the brake pedal with his/her left foot so as to drive their cars using their left foot and right foot separately to depress the brake pedal and the accelerator pedal, respectively. For such drivers using both their feet separately for the brake pedal and the accelerator pedal, there may be a possible situation that the brake pedal is depressed while the accelerator pedal is not yet released by the driver or the accelerator pedal is depressed while the brake pedal is not yet released by the driver.

Therefore, the intention of the driver is not always to reduce the speed when the both accelerator and brake pedals are being depressed, and this may lead to the deterioration of drivability.

Apparently, there has so far been a vehicle control apparatus known to reduce an engine torque in the event that the accelerator pedal and the brake pedal are depressed at the same time (see, for example, Patent Document 1).

The previously mentioned conventional vehicle control apparatus is constructed to reduce the torque output from the engine by temporarily reducing the amount of fuel injection to the engine in the event that the accelerator pedal and the brake pedal are depressed at the same time.

In some modern vehicle control apparatuses, a vehicle behavior stabilization control that stabilizes the behavior of the vehicle is provided. Such vehicle behavior stabilization control includes a traction control system (TRC) and an anti-skid control device.

The TRC is to prevent slipping of the driving wheels at the time of starting or accelerating the vehicle. For example, the TRC is adapted to determine the slipping of the driving wheels from the vehicle speed, the rotation speed of each of the wheels, and the like, and then reduce or adjust the torque output from the engine to eliminate the slipping situation.

A typical anti-skid control device known includes a vehicle stability control (VSC). The VSC maintains the stability of a vehicle at the time of driving through a turn, avoiding an obstacle, or the like. More specifically, the VSC prevents skidding when the vehicle loses the balance due to entering a corner at an excessive speed or an operation of abrupt steering wheel, exercising an excellent driving stability. For example, the VSC detects the vehicle balance and the like with sensors and, if a situation of understeer is detected, the VSC reduces the torque output from the engine and applies braking to the rear wheel on the inner side of a turn. When a situation of oversteer is detected, the VSC applies braking to the front wheel on the outer side of the turn. The VSC controls the engine and the braking in response to the drive state to prevent skidding, wide turns, or the like of the vehicle, thereby allowing the vehicle to travel safely through a corner without needing a driver to consciously make adjustments in driving operation.

PRIOR ART DOCUMENTS

Patent Documents

Patent Document 1: Japanese Patent Publication No. S62-051737

SUMMARY OF THE INVENTION

Problems to be Solved

However, the conventional vehicle control apparatus is constructed to uniformly reduce the amount of fuel injection when the accelerator pedal and the brake pedal are depressed at the same time by the driver, thereby reducing the torque irrespective of the running condition of the vehicle. This means that the torque is reduced with simultaneous depression of the accelerator pedal and the brake pedal by the driver. For this reason, even if the accelerator pedal and the brake pedal are intentionally depressed at the same time, an anticipated hesitation or other unfavorable phenomenon may occur on the vehicle, thereby leading to problems such as the deterioration in drivability.

Furthermore, the vehicle behavior stabilization device such as the TRC or the VSC carries out the control of the driving force output from a driving source and the control of the braking of the wheels, but not linked with the operation of the accelerator pedal. Accordingly, it is necessary to consider the behavior of the vehicle when the accelerator pedal and the brake pedal are depressed at the same time while the TRC or the VSC is being activated.

The present invention has been made to solve such conventional problems. It is therefore an object of the present invention to provide a vehicle control apparatus that can prevent the drivability from being deteriorated.

Means for Solving Problems

To achieve the above object, (1) a vehicle control apparatus according to the present invention is for a vehicle provided with a drive source, an accelerator pedal, and a brake pedal, the vehicle control apparatus comprising a drive state detection unit that detects a drive state of the vehicle including a driving force required amount of driving force output from the drive source, an output control portion that executes a reduction control of reducing the driving force output from the drive source with respect to the driving force required amount, a speed reduction determination portion that determines speed reduction of the vehicle by comparing a speed reduction value calculated based on the drive state detected by the drive state detection unit with a speed reduction threshold value set for determining the speed reduction, and a vehicle behavior stabilization control portion that executes a vehicle behavior stabilization control of stabilizing behavior of the vehicle based on the drive state detected by the drive state detection unit, in which the drive state detection unit includes an accelerator detection unit that detects depression of the accelerator pedal, and a brake detection unit that detects depression of the brake pedal, the speed reduction determination portion is operative to change the speed reduction threshold value to determine the speed reduction of the vehicle when the vehicle behavior stabilization control is being executed by the vehicle behavior stabilization control portion, and the output control portion is operative to execute the reduction control under a condition in that the speed reduction is determined by the speed reduction determination portion when the depression of the accelerator pedal is detected by the accelerator detection unit and the depression of the brake pedal is detected by the brake detection unit, and does not execute the reduction control when this condition is not established.

According to the vehicle control apparatus thus constructed, the reduction control is executed under the condition that the speed reduction is determined and the reduction control is not executed when the above condition is not established. Furthermore, when the vehicle behavior stabilization control that stabilizes the behavior of the vehicle is determined to be in operation, the speed reduction of the vehicle is determined by changing the speed reduction threshold value for determining the speed reduction. This makes it possible to adequately detect the speed reduction of the vehicle even when the drive state of the vehicle is changed by the execution of the vehicle behavior stabilization control, thereby allowing the execution and non-execution of the reduction control to be switched reflecting a driver's intention and thus preventing the drivability from being deteriorated.

In the vehicle control apparatus according to the invention constructed as described as in (1) above, (2) the drive state detection unit may include a vehicle speed detection unit that detects a vehicle speed, and the speed reduction determination portion may set the speed reduction threshold value in response to the vehicle speed detected by the vehicle speed detection unit.

According to the vehicle control apparatus thus constructed, the speed reduction threshold value is set in response to the vehicle speed, thereby making it possible to vary the range of determining the speed reduction to an adequate value in response to the vehicle speed. Accordingly, the vehicle control apparatus thus constructed can perform the speed reduction determination more adequately than the determination performed with a fixed speed reduction threshold value, thereby enhancing the adequacy in determining the execution or non-execution of the reduction control, and thereby making it possible to prevent the drivability from being deteriorated.

In the vehicle control apparatus according to the invention constructed as described as in (1) or (2) above, (3) the accelerator detection unit may detect a depression amount of the accelerator pedal, and the speed reduction determination portion may set the speed reduction threshold value in response to the depression amount of the accelerator pedal detected by the accelerator detection unit.

According to the vehicle control apparatus thus constructed, the speed reduction threshold value is set in response to the depression amount of the accelerator pedal, thereby making it possible to vary the range of determining the speed reduction to an adequate value in response to the depression amount of the accelerator pedal. Accordingly, the vehicle control apparatus thus constructed can perform the speed reduction determination more adequately than the determination performed with a fixed speed reduction threshold value, thereby enhancing the adequacy in determining the execution or non-execution of the reduction control, and thereby making it possible to prevent the drivability from being deteriorated.

In the vehicle control apparatus according to the invention constructed as described as in any of (1) to (3) above, (4) the speed reduction determination portion may set the speed reduction threshold value based on a speed reduction threshold value map preset.

According to the vehicle control apparatus thus constructed, the speed reduction threshold value is set based on the speed reduction threshold value map allowing the speed reduction determination value to be adequately set in response to the drive state of the vehicle. Consequently, this makes it possible to adequately determine the speed reduction, thereby enhancing the adequacy of the determination to execute or not to execute the reduction control, and thereby preventing the drivability from being deteriorated.

In the vehicle control apparatus according to the invention constructed as described as in any of (1) to (3) above, (5) the speed reduction determination portion may set the speed reduction threshold value based on a speed reduction threshold value calculation formula preset.

According to the vehicle control apparatus thus constructed, the speed reduction threshold value is set based on the speed reduction threshold value calculation formula. This makes it possible to easily set the speed reduction determination value in response to the drive state of the vehicle without using a large additional memory, thereby allowing an adequate speed reduction determination to be made. Accordingly, the adequacy in determining the execution or non-execution of the reduction control can be enhanced and the deterioration of the drivability can be prevented.

In the vehicle control apparatus according to the invention constructed as described as in any of (1) to (5) above, (6) the drive state detection unit may include a wheel rotation speed detection unit that detects a rotation speed of each of wheels of the vehicle, the vehicle behavior stabilization control portion may execute the vehicle behavior stabilization control by determining a slip of wheel from the rotation speed of each of the wheels detected by the wheel rotation speed detection unit and by controlling the driving force output from the drive source based on the determination of the slip, and the speed reduction determination portion may change the speed reduction threshold value to determine the speed reduction of the vehicle when the vehicle behavior stabilization control that controls the driving force output from the drive source is being executed by the vehicle behavior stabilization control portion.

According to the vehicle control apparatus thus constructed, the vehicle behavior stabilization control portion executes the vehicle behavior stabilization control by controlling the driving force output from the driving source, and the speed reduction determination portion determines the speed reduction of the vehicle by changing the speed reduction threshold value in the event of the vehicle behavior stabilization control being executed. This allows the speed reduction determination to be carried out adequately even when the vehicle behavior stabilization control, such as a TRC which controls the driving force output from the drive source, is being executed, thereby making it possible to prevent the drivability from being deteriorated. Accordingly, when the vehicle behavior stabilization control is being executed, particularly in the travelling direction of the vehicle, viz., the longitudinal direction as in the case of the TRC, the adequacy of the speed reduction determination can be enhanced.

In the vehicle control apparatus according to the invention constructed as described as in any of (1) to (6) above, (7) the vehicle control apparatus may further comprise a braking unit that applies braking on each of wheels of the vehicle, and the drive state detection unit may include a vehicle balance detection portion that detects balancing behavior of the vehicle, the vehicle behavior stabilization control portion may execute the vehicle behavior stabilization control by controlling the braking on each of the wheels of the vehicle by the braking unit based on the balancing behavior of the vehicle detected by the vehicle balance detection portion, and the speed reduction determination portion may change the speed reduction threshold value to determine the speed reduction of the vehicle when the vehicle behavior stabilization control that controls the braking on each of the wheels is being executed by the vehicle behavior stabilization control portion.

According to the vehicle control apparatus thus constructed, the vehicle behavior stabilization control portion executes the vehicle behavior stabilization control by controlling the braking of each of the wheels of the vehicle, and the speed reduction determination portion determines the speed reduction of the vehicle by changing the speed reduction threshold value in the event of the vehicle behavior stabilization control being executed. This allows the speed reduction determination to be carried out adequately even when a control by an anti-skid control device, particularly a vehicle behavior stabilization control such as a VSC which controls the braking of the wheels, is being executed, thereby making it possible to prevent the drivability from being deteriorated. Accordingly, when the vehicle behavior stabilization control is being executed, particularly in the traverse direction of the vehicle, the adequacy of the speed reduction determination can be enhanced.

Effect of Invention

According to the present invention, the vehicle control apparatus can be provided in which the execution or non-execution of the reduction control can be switched reflecting the driver's intention even when the driving force control or the braking control is being executed by the vehicle behavior stabilization control that stabilizes the balance of the vehicle, allowing the deterioration of the drivability to be prevented.

BRIEF EXPLANATION OF THE DRAWINGS

FIG. 5 is an operating table indicating the engagement state of frictional engagement elements to realize each speed change stage according to the embodiment of the invention;

FIG. 7 is a flowchart indicating the process of the vehicle control according to the embodiment of the invention.

DETAILED DESCRIPTION OF PREFERRED EMBODIMENTS

Exemplary embodiments of the present invention will be described hereinafter with reference to the accompanying drawings. First, the construction of a vehicle having a control apparatus according to an embodiment of the present invention will be described with reference to the schematic block diagram of the vehicle depicted in FIG. 1 and the schematic block diagram of the vehicle control depicted in FIG. 2.

Figure 1:
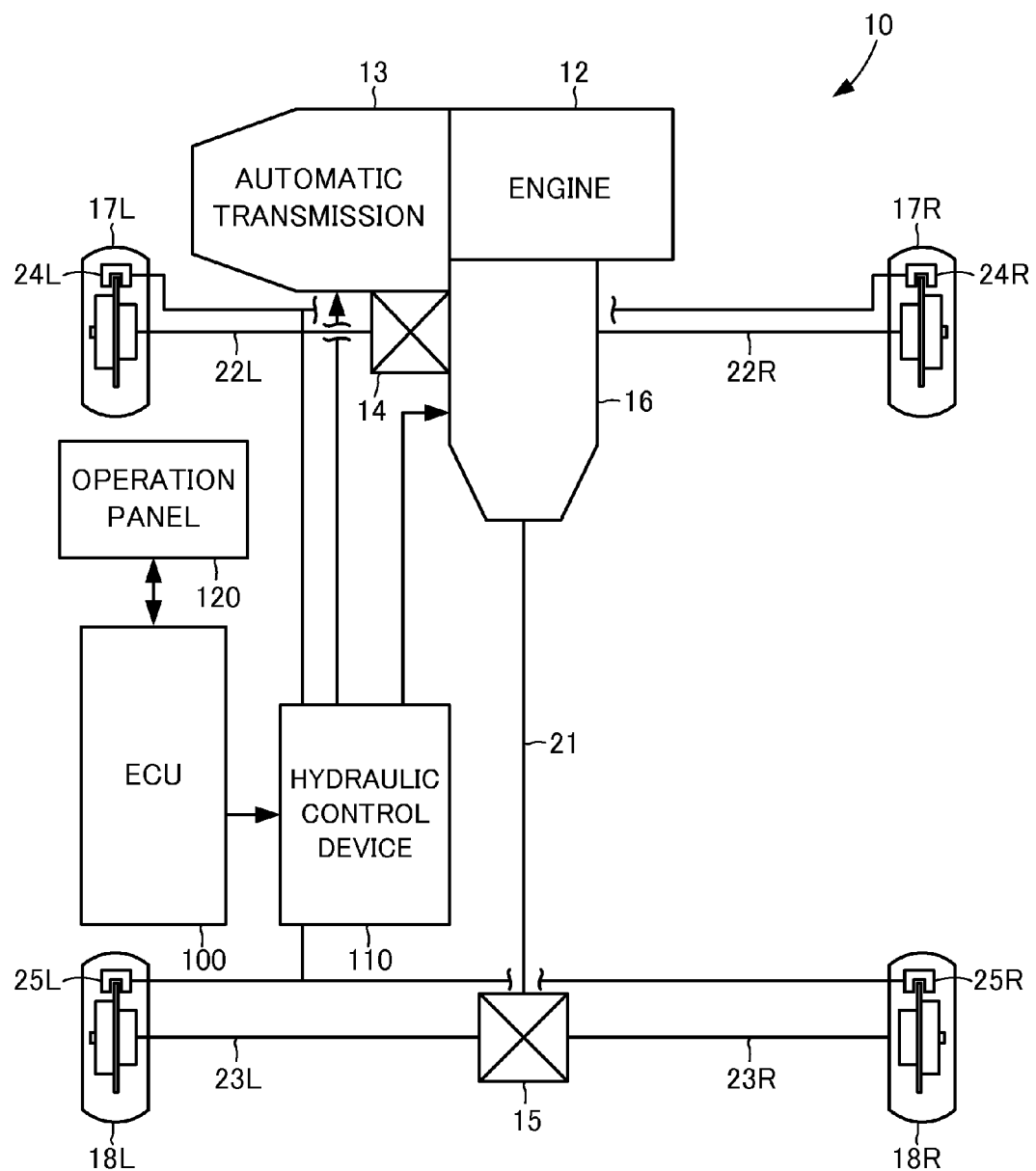
FIG. 1 is a schematic block diagram of a vehicle equipped with a control apparatus according to an embodiment of the present invention.

As depicted in FIG. 1, a vehicle 10 according to the present embodiment comprises an engine 12 serving as a drive source, an automatic transmission 13 that transmits a torque generated by the engine 12 and forms speed change stages corresponding to the running condition of the vehicle 10, a front differential mechanism 14 that distributes the torque transmitted from the automatic transmission 13 to left and right front drive shafts 22L, 22R, a rear differential mechanism 15 that distributes the torque transmitted by a propeller shaft 21 to left and right rear drive shafts 23L, 23R, a transfer 16 that distributes the torque transmitted by the automatic transmission 13 to front wheels 17L, 17R side and rear wheels 18L, 18R side, braking devices 24L, 24R that put brakes on the front wheels 17L, 17R, respectively, and braking devices 25L, 25R that put brakes on the rear wheels 18L, 18R, respectively.

The vehicle 10 further comprises an ECU (Electronic Control Unit) 100 serving as a vehicle electronic control unit that controls the entire vehicle 10, a hydraulic control device 110 that hydraulically controls the automatic transmission 13 and the transfer 16, and an operation panel 120 serving as an input/output interface with a driver.

Figure 2:
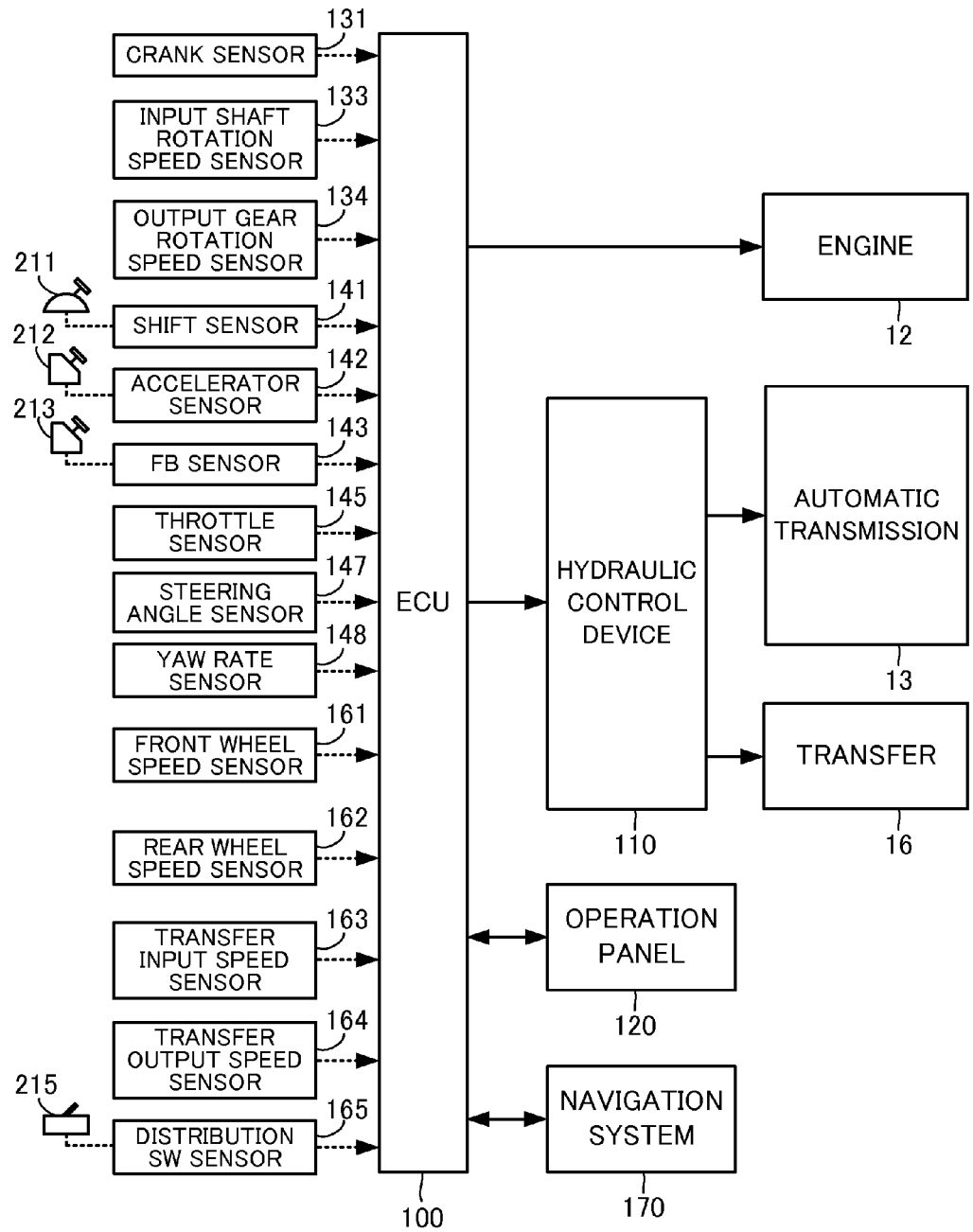
FIG. 2 is a schematic block diagram of a vehicle control according to the embodiment of the invention.

Furthermore, as shown in FIG. 2, the vehicle 10 is provided with a crank sensor 131, an input shaft rotation speed sensor 133, an output gear rotation speed sensor 134, a shift sensor 141, an accelerator sensor 142, a foot brake sensor (hereinafter referred to as an FB sensor) 143, a throttle sensor 145, a steering angle sensor 147, a yaw rate sensor 148, a front wheel speed sensor 161, a rear wheel speed sensor 162, a transfer input speed sensor 163, a transfer output speed sensor 164, a distribution SW sensor 165, and various kinds of other sensors not shown in the drawing. The above mentioned sensors provided on the vehicle 10 are adapted to output their detection signals to the ECU 100.

An ordinary vehicle may not be provided with all of the sensors 131 to 165, and all of those sensors 131 to 165 are not always necessary to be provided for the vehicle according to the present invention. For example, the function of one sensor can be substituted by other sensors, or a similar control can be achieved using a value detected by the other sensors. Thus, the vehicle 10 may not be equipped with the sensors that can be substituted by the other sensors. In the present embodiment, those previously mentioned sensors some of which may not be provided to the ordinary vehicles are raised for explaining hereinafter their respective processes according to the invention. The alternative processing with the other sensors will be discussed later.

The engine 12 is constituted by a known power device that outputs torque by combusting a mixture of hydrocarbon fuel such as gasoline or diesel and air in a combustion chamber of a cylinder not shown. The engine 12 is operated to intermittently repeat the actions of taking in the air-fuel mixture into the combustion chamber of the cylinder, combusting the mixture in the cylinder, and discharging exhaust gas to the outside of the cylinder so as to reciprocate a piston in the cylinder and to rotate a crankshaft coupled to the piston in a power transmittable manner, thereby transmitting the torque to the automatic transmission 13. The fuel to be used for the engine 12 may be an alcohol fuel including alcohol such as ethanol.

The automatic transmission 13 comprises a plurality of planetary gear devices each provided with a plurality of friction engagement elements constituted by clutches and brakes operative to be selectively engaged or disengaged, thereby forming a plurality of speed change stages in response to the combination of the engagement and disengagement of the clutches and the brakes. The clutches and the brakes are constructed to be switched selectively into their engaged states or their disengaged states by the hydraulic control device 110.

By this construction, the automatic transmission 13 functions as a staged transmission to reduce or increase the torque or the rotation of the crankshaft of the engine 12 input as a driving force at a given speed change ratio γ to be output to the front differential mechanism 14 and the transfer 16. This means that the automatic transmission 13 constitutes a plurality of speed change stages operable in response to the running condition of the vehicle and thus can carry out a speed conversion in response to the speed change stages. The detailed explanation about the automatic transmission 13 will be described later. The automatic transmission 13 may be composed of a continuously variable transmission that continuously changes the speed change ratio.

The front differential mechanism 14 is operative to allow the rotation speeds to be different between the front wheels 17R and 17L when the vehicle is travelling through a curved road. The front differential mechanism 14 comprises a plurality of gears to distribute and output the torque received from the automatic transmission 13 to the front drive shafts 22L, 22R. The front differential mechanism 14 may be constructed to have a diff-locked state in which the front drive shafts 22L, 22R are rotated at the same rotation speed and thus, operated having no difference in rotation speed between the front wheels 17L, 17R. The detailed explanation about the front differential mechanism 14 will be described hereinafter.

The rear differential mechanism 15 is substantially the same in construction as the front differential mechanism 14 and therefore, the explanation about the rear differential mechanism 15 will be omitted hereinafter.

The transfer 16, also referred to as an auxiliary transmission, serves to distribute and transmit the torque transmitted by the automatic transmission 13 to the front differential mechanism 14 and the rear differential mechanism 15. This means that the torque transmitted by the automatic transmission 13 can be distributed and transmitted by the transfer 16 to the front wheels 17L, 17R side and the rear wheels 18L, 18R side.

The vehicle 10 in the present embodiment is exemplified as a front-wheel driving vehicle at the time of a normal drive state in which the front wheels 17L, 17R serve as driving wheels, respectively, when a four-wheel drive state is not selected. The transfer 16 is operative in the normal drive state and the four-wheel drive state as described hereinafter. This means that the transfer 16 can be operated at the normal drive state to transmit the torque transmitted by the automatic transmission 13 only to the front differential mechanism 14, but not to the rear differential mechanism 15. Further, the transfer 16 can be operated at the four-wheel drive state in which the torque transmitted by the automatic transmission 13 is also transmitted to the rear differential mechanism 15 and thus, is distributed to the front differential mechanism 14 as well as to the rear differential mechanism 15. The detailed description about the transfer 16 will become apparent as the description proceeds.

The braking devices 24L, 24R and the braking devices 25L, 25R have each a brake master cylinder, a brake actuator, and a brake body not shown in the drawings. The brake master cylinder is operative to generate hydraulic pressure in response to the depression amount of a foot brake pedal 213. The hydraulic pressure generated in the master cylinder is transmitted to the brake body through the brake actuator. The brake body is adapted to convert the hydraulic pressure transmitted to a mechanical force to apply a brake on the respective front wheels 17L, 17R and rear wheels 18L, 18R.

Further, the braking devices 24L, 24R and the braking devices 25L, 25R are operative to apply braking on the front wheels 17L, 17R and the rear wheels 18L, 18R, respectively, by the hydraulic control of the hydraulic control device 110 at the time of a VSC being executed by the ECU 100 regardless of the depression amount of the foot brake pedal 213.

The VSC is one of the vehicle behavior stabilization controls carried out by the ECU 100. The braking device 24L is adapted to apply the brake on the front wheel 17L, while the braking device 24R applies the brake on the front wheel 17R. The braking device 25L applies the brake on the front wheel 18L, and the braking device 25R applies the brake on the front wheel 18R.

The ECU 100 comprises a CPU (Central Processing Unit) as a central processing unit, a ROM (Read Only Memory) for storing therein fixed data, a RAM (Random Access Memory) for temporarily storing data, an EEPROM (Electrically Erasable and Programmable Read Only Memory) composed of a rewritable non-volatile memory, and an I/O interface circuit, and is designed to carry out the overall control of the vehicle 10.

As will be described below, the ECU 100 is connected to the crank sensor 131, the accelerator sensor 142, and the other sensors. The ECU 100 is adapted to receive detection signals output from those sensors to detect an engine rotation speed Ne, an accelerator opening degree Acc, and others.

Further, the ECU 100 is adapted to control the hydraulic control device 110 that controls the hydraulic pressure applied to the respective parts of the automatic transmission 13 and the transfer 16. The distinctive features of the ECU 100 will be described hereinafter.

In addition, the ROM of the ECU 100 stores therein an operating table to be used for realizing the speed change stages and a program for executing the vehicle control as described hereinafter. Further, the ROM of the ECU 100 stores therein a throttle opening degree control map, a gear shifting diagram, a lock-up control map, and various other values of the vehicle 10 which will not be described hereafter.

Furthermore, the ROM of the ECU 100 stores therein an accelerator pedal depression determination value Acc_tv, a brake pedal depression determination value Bf_tv, a speed reduction threshold value map, a speed reduction threshold value calculation formula, an output reducing accelerator opening degree Acn, and others as necessary.

The accelerator pedal depression determination value Acc_tv is indicative of a determination value for determining whether the vehicle 10 is under an accelerator-on state or an accelerator-off state in response to the depression amount of an accelerator pedal 212. The brake pedal depression determination value Bf_tv is indicative of a determination value for determining whether the vehicle 10 is under a brake-on state or a brake-off state in response to the depression amount of the foot brake pedal 213.

The speed reduction threshold value map is a map used to set a speed reduction threshold value in response to the vehicle speed V and the accelerator opening degree Acc of the vehicle 10. More specifically, the speed reduction threshold value map is a two dimensional table constituted by set values of the speed reduction threshold value for each of predetermined values of the vehicle speed V and the accelerator opening degree Acc. The speed reduction threshold value is indicative of an acceleration αr for determining whether or not the vehicle 10 is under the speed reduction state.

The ECU 100 set the speed reduction threshold value based on the speed reduction threshold value map corresponding to the vehicle speed V and the accelerator opening degree Acc detected. In the situation where the vehicle speed V or the accelerator opening degree Acc detected is not the vehicle speed V or the accelerator opening degree Acc originally set in the speed reduction threshold value map, the ECU 100 also sets the speed reduction threshold value from the other values set in the speed reduction threshold value map, for example, by linear transformation to interpolate them.

Figure 3:
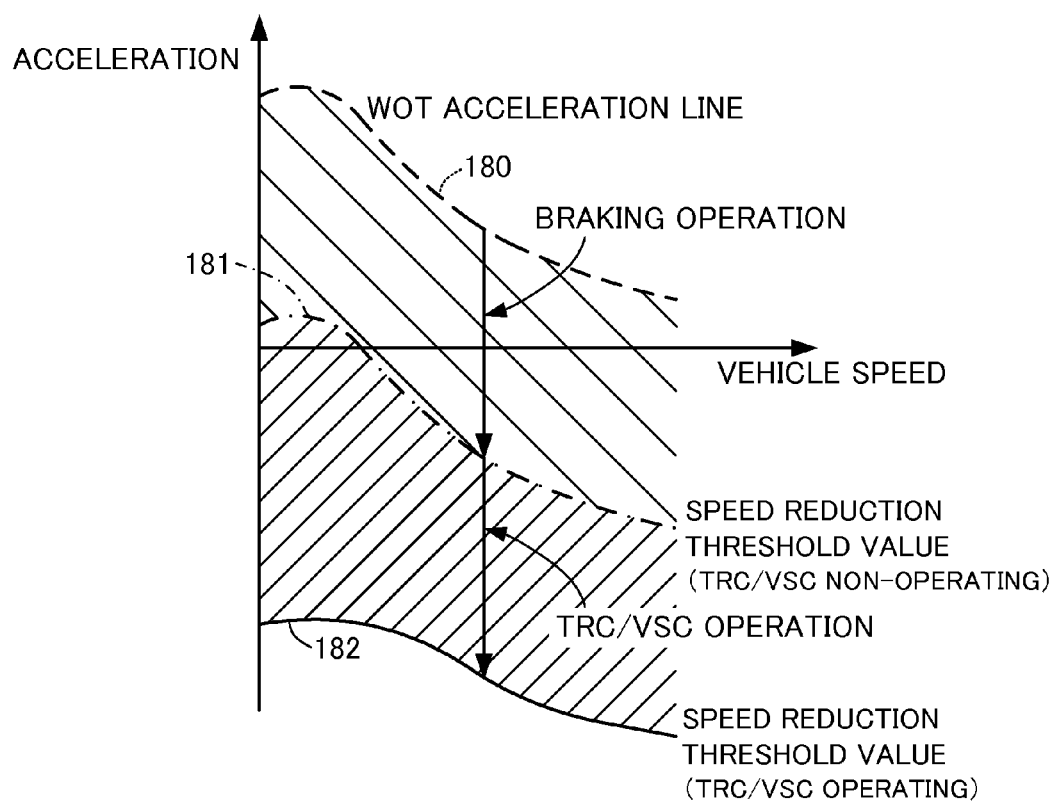
FIG. 3 is a graph indicating values of speed reduction threshold values set by a speed reduction threshold value map according to the embodiment of the invention.

The ECU 100 determines that the vehicle 10 is in the speed reduction when the acceleration αr calculated is below the speed reduction threshold value thus set, while the ECU 100 determines that the vehicle 10 is not in the speed reduction when the acceleration αr calculated is larger than the speed reduction threshold value set. FIG. 3 is a graph showing the values of the speed reduction threshold values set by the speed reduction threshold value map under the condition that the accelerator opening degree Acc is at a maximum. The condition of the accelerator opening degree Acc being at the maximum is hereinafter referred to as WOT (Wide Open Throttle).

The speed reduction threshold values in the speed reduction threshold value map are set according to whether the TRC or the VSC is active or the TRC or the VSC is not active, respectively. Hereinafter, the condition of the TRC or the VSC being active is referred to as TRC/VSC active mode, while the condition of the TRC and the VSC not being active is referred to as TRC/VSC non-active mode.

As a consequence, the speed reduction threshold values are separately set for the TRC/VSC active mode and for the TRC/VSC non-active mode in the speed reduction threshold value map. This makes it possible for the ECU 100 to set a different speed reduction threshold value in response to the operating condition of the TRC and the VSC even when the accelerator opening degree Acc or the vehicle speed V is the same. The details of the TRC and the VSC will be described later.

The speed reduction threshold value calculation formula is the calculation formula used to calculate the speed reduction threshold value corresponding to the vehicle speed V and the accelerator opening degree Acc of the vehicle 10. For example, the speed reduction threshold value calculation formula in the TRC/VSC non-active mode is the formula expressing the speed reduction threshold values indicated by a dashed-dotted line 181 shown in FIG. 3, while the speed reduction threshold value calculation formula in the TRC/VSC active mode is the formula expressing the speed reduction threshold values indicated by a solid line 182 shown in FIG. 3. The broken line 180 represents the acceleration αr versus the vehicle speed V under the condition that the foot brake pedal 213 is not depressed and in the TRC/VSC non-active mode, viz., neither the TRC nor the VSC is active, at WOT.

Further, the ECU 100 only needs to store in the ROM either one of the speed reduction threshold value map or the speed reduction threshold value calculation formula. Alternatively, the ECU 100 may set different values for the speed reduction threshold value set by the speed reduction threshold value map and for the speed reduction threshold value set by the speed reduction threshold value calculation formula and store in the ROM both the speed reduction threshold value map and the speed reduction threshold value calculation formula so that the use of the map or the calculation formula is switched corresponding to the running condition and the like of the vehicle.

The output reducing accelerator opening degree Acn is intended to indicate an accelerator opening degree set for reducing the output of the engine 12 from the accelerator opening degree Acc in an actual state at the time of a control permission condition to be described hereinafter being established. The output reducing accelerator opening degree Acn may also be calculated in response to the running condition of the vehicle 10.

The hydraulic control device 110 comprises linear solenoid valves SLT, SLU, an on-off solenoid valve SL, and linear solenoid valves SL1 to SL5, each of which is constituted as an electromagnetic valve to be controlled by the ECU 100. The hydraulic control device 110 is adapted to be controlled by the ECU 100 to activate the foregoing solenoid valves so as to hydraulically control and switch the hydraulic circuit to operate the respective parts of the automatic transmission 13. Therefore, the hydraulic control device 110 is adapted to have the solenoid valves controlled so that the solenoid valves can be switched to establish a desired speed change stage of the transmission mechanism 13.

The operation panel 120 is operatively connected with the ECU 100 to receive operational requests entered by the driver, to perform operational assistances to the driver, and to display the running condition of the vehicle and others. For example, when the driver enters one of running modes using switches provided on the operation panel 120, the operation panel 120 is adapted to output a signal indicative of the running mode entered by the driver to the I/O interface of the ECU 100.

The crank sensor 131 is adapted to detect the rotation speed of a crankshaft 24 under the control of the ECU 100 and to output a detection signal indicative of the rotation speed to the ECU 100. The ECU 100 is adapted to acquire the rotation speed of the crankshaft 24 indicated by the signal output from the crank sensor 131 as the engine rotation speed Ne.

The input shaft rotation speed sensor 133 is adapted to detect the rotation speed of an input shaft 71 described below under the control of the ECU 100 and to output a detection signal indicative of the rotation speed to the ECU 100. The input shaft 71 is directly connected with a turbine shaft 62 of a torque converter 60 described later. The input shaft 71 has the rotation speed as the same as the rotation speed of the turbine shaft 62, so that an input shaft rotation speed Nm detected by the input shaft rotation speed sensor 133 is represented as a turbine rotation speed Nt.

The output gear rotation speed sensor 134 is adapted to detect the rotation speed of an output gear 72 described later under the control of the ECU 100 and to output a detection signal indicative of the detected rotation speed to the ECU 100.

In addition, the ECU 100 is capable of calculating a speed change ratio γ in accordance with the input shaft rotation speed Nm detected by the input shaft rotation speed sensor 133 and an output gear rotation speed Nc detected by the output gear rotation speed sensor 134. Here, the speed change ratio γ is acquired by dividing the actual input shaft rotation speed Nm of the input shaft 71 by the actual output gear rotation speed Nc of the output gear 72.

The shift sensor 141 is adapted to detect any one of switched positions taken by the shift lever 211 among the switched positions taken by the shift lever 211 under the control of the ECU 100 and to output a detection signal indicative of the switched position taken by the shift lever 211 to the ECU 100.

Here, the shift lever 211 is constructed to take, from the rear side of the vehicle 10 to the forward side, a D position indicative of a driving range (hereinafter simply referred to as D range), an N position indicative of a neutral range, an R position indicative of a reverse range, and a P position indicative of a parking range.

If the shift lever 211 is located in the D range, a later described transmission mechanism 70 can establish any one of the speed change stages from among the first to sixth speed change stages as described below. In this way, the ECU 100 can select any one of the speed change stages from among the first to sixth speed change stages in accordance with the vehicle speed V and a throttle opening degree θth.

The accelerator sensor 142 is adapted to detect the depression amount (hereinafter simply referred to as stroke) of the accelerator pedal 212 under the control of the ECU 100 when the accelerator pedal 212 is depressed and to output a detection signal indicative of the detected stroke to the ECU 100. In addition, the ECU 100 is designed to calculate the accelerator opening degree Acc from the stroke of the accelerator pedal 212 indicated by the detection signal output from the accelerator sensor 142.

Therefore, the accelerator sensor 142 is adapted to detect the drive state of the vehicle 10, including the required amount of torque output from the engine 12. This means that the accelerator sensor 142 constitutes a drive state detection unit. The accelerator sensor 142 is capable of detecting the depression of the accelerator pedal 212 as well as the depression amount of the accelerator pedal 212. This means that the accelerator sensor 142 constitutes an accelerator detection unit.

The FB sensor 143 is adapted to detect whether or not the foot brake pedal 213 is depressed under the control of the ECU 100 when the foot brake pedal 213 is depressed and to output a detection signal to the ECU 100.

This means that the FB sensor 143 is adapted to detect the drive state of the vehicle 10. In other words, the FB sensor 143 constitutes a drive state detection unit. Additionally, the FB sensor 143 is adapted to detect the depression of the foot brake pedal 213. This means that the FB sensor 143 constitutes a brake detection unit.

The throttle sensor 145 is adapted to detect the opening degree of a throttle valve of the engine 12 driven by a throttle actuator not shown under the control of the ECU 100 and to output a detection signal indicative of the detected opening degree to the ECU 100. The ECU 100 is designed to acquire the throttle valve opening degree indicated by the detection signal output from the throttle sensor 145 as a throttle opening degree θth.

The ECU 100 is adapted to acquire the throttle opening degree θth from the accelerator opening degree Acc based on the throttle opening degree control map so that, without using the detection signal output from the throttle sensor 145, the throttle opening degree θth obtained from the above throttle opening degree control map can be used to substitute as a detected value. Here, in the situation that the accelerator opening degree is changed by the torque reduction control of the engine 12, the ECU 100 acquires the throttle opening degree θth from the output reducing accelerator opening degree Acn changed.

The steering angle sensor 147 is adapted to detect the rotation angle of a steering wheel under the control of the ECU 100 and to output the detection signal indicative of the detected rotation angle of the steering wheel to the ECU 100. The ECU 100 is designed to acquire the rotation angle of the steering wheel indicated by the detection signal output from the steering angle sensor 147 as a steering angle θth.

Accordingly, the steering angle sensor 147 is adapted to detect the drive state of the vehicle 10. This means that the steering angle sensor 147 constitutes a drive state detection unit.

The yaw rate sensor 148 is adapted to detect the rate of change in rotation angle of the vehicle 10 in a turning direction (hereinafter referred to as yaw rate) under the control of the ECU 100 and to output a detection signal indicative of the detected yaw rate to the ECU 100. The ECU 100 is designed to acquire the rate of change in rotation angle in the turning direction of the vehicle indicated by the detection signal output from the yaw rate sensor 148 as a yaw rate ω.

Accordingly, the yaw rate sensor 148 is adapted to detect the drive state of the vehicle 10. This means that the yaw rate sensor 148 constitutes a drive state detection unit.

The front wheel speed sensor 161 is controlled by the ECU 100 to detect the rotation speeds of the front drive shaft 22L and the front drive shaft 22R, and to output the respective detected signals indicative of the rotation speeds of the front drive shafts 22L and 22R to the ECU 100. The ECU 100 is designed to acquire the rotation speeds of the front drive shaft 22L and the front drive shaft 22R indicated by the detection signals output from the front wheel speed sensor 161 as drive shaft rotation speeds NfL, NfR, respectively.

Further, the ECU 100 calculates the vehicle speed V based on the rotation speed of the drive shaft rotation speed NfL or the drive shaft rotation speed NfR acquired from the front wheel speed sensor 161. Therefore, the front wheel speed sensor 161 is designed to detect the drive state of the vehicle 10. This means that the front wheel speed sensor 161 constitutes a drive state detection unit. In addition, the front wheel speed sensor 161 is adapted to detect the speed of the vehicle 10. This means that the front wheel speed sensor 161 constitutes a vehicle speed detection unit.

Furthermore, the front wheel speed sensor 161 is adapted to detect the rotation speeds of the front wheels 17L, 17R of the vehicle 10. This means that the front wheel speed sensor 161 constitutes a wheel rotation speed detection unit.

Here, the vehicle speed V is indicative of the vehicle speed in the event of the vehicle 10 being travelling on a normal road. In the event of the vehicle 10 being travelling on a bad road or the like with the front wheels 17L, 17R being likely to be under a slipping situation, a vehicle body speed Vr or a wheel speed Vs is available as will be explained hereinafter.

The rear wheel speed sensor 162 is adapted to detect the rotation speeds of the rear drive shaft 23L and the rear drive shaft 23R under the control of the ECU 100 and to output the respective detection signals indicative of the rotation speeds of the rear drive shafts 23L, 23R to the ECU 100. The ECU 100 is designed to acquire the rotation speeds of the rear drive shaft 23L and the rear drive shaft 23R indicated by the detection signals output from the rear wheel speed sensor 162 as rear wheel rotation speeds NrL, NrR, respectively.

Further, the ECU 100 is designed, in the situation where the driving only by the front wheels 17L, 17R, viz., the front-wheel drive is selected, to calculate the vehicle body speed Vr based on the rotation speed of the rear wheel rotation speed NrL or the rear wheel rotation speed NrR acquired from the rear wheel speed sensor 162. Here, the rear wheels 18L, 18R are free rolling wheels not driven by the engine 12. This makes it possible to acquire the vehicle body speed Vr that is the actual vehicle speed of the vehicle 10 by detecting the rotation speed of the rear wheels 18L, 18R.

Therefore, the rear wheel speed sensor 162 is designed to detect the drive state of the vehicle 10. This means that the rear wheel speed sensor 162 constitutes a drive state detection unit. The rear wheel speed sensor 162 is adapted to detect the rotation speeds of the rear wheels 18L, 18R of the vehicle 10. This means that the rear wheel speed sensor 162 constitutes a wheel rotation speed detection unit.

The transfer input speed sensor 163 is adapted to detect a rotation speed TRin of an input shaft of the transfer 16 under the control of the ECU 100 and to output a detection signal indicative of the detected rotation speed to the ECU 100. More specifically, the ECU 100 is designed to detect the rotation speed of an input shaft 54 of a transfer clutch 53 as will become apparent hereinafter.

The transfer output speed sensor 164 is adapted to detect a rotation speed TRout of an output shaft of the transfer 16 under the control of the ECU 100 and to output a detection signal indicative of the detected rotation speed to the ECU 100. More specifically, the ECU 100 is designed to detect the rotation speed of the propeller shaft 21.

The distribution SW sensor 165 is adapted to detect whether a power changing switch 215 assumes a two-wheel drive selection position or a four-wheel drive selection position under the control of the ECU 100 and to output a detection signal indicative of the changed position of the power changing switch 215 to the ECU 100. The state in which the four-wheel drive is selected by the power changing switch 215 and a transfer gear in low gear is selected is referred to as the selection of L4-SW mode, hereinafter. The power changing switch 215 may be constructed to select a distribution ratio of the driving force between the front wheels 17L, 17R and the rear wheels 18L, 18R, in place of the choice between the two selection positions of the two-wheel drive selection and the four-wheel drive selection.

Next, the construction of the automatic transmission 13 in the present embodiment will be described with reference to the schematic block diagram shown in FIG. 4.

Figure 4:
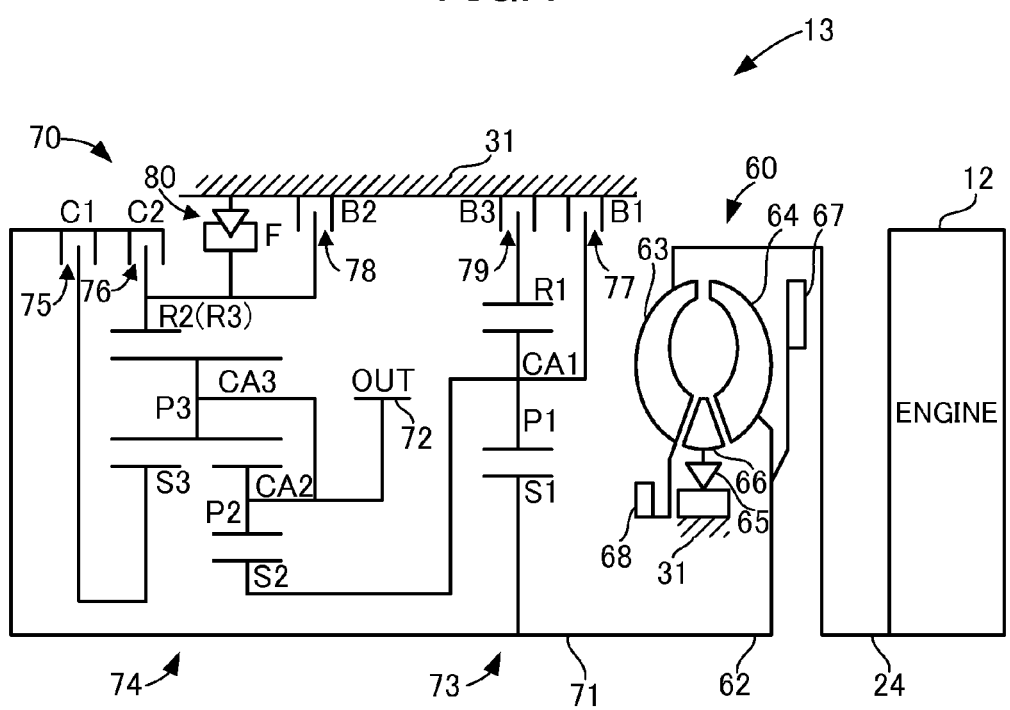
FIG. 4 is a schematic block diagram illustrating the structure of an automatic transmission according to the embodiment of the invention.

As shown in FIG. 4, the automatic transmission 13 comprises the torque converter 60 that transmits the torque output from the engine 12 and the transmission mechanism 70 that changes the rotation speed of the input shaft 71 serving as an input shaft to the rotation speed of the output gear 72 serving as an output gear.

Generally, a reduction gear mechanism is provided between the transmission mechanism 70 and the front differential mechanism 14 which receives the torque from the transmission mechanism 70 and outputs the torque to the front differential mechanism 14 while the rotation speed is being reduced and the driving force is being increased. However, for the sake of simplifying the explanation, the vehicle 10 in the present embodiment will be described as being designed to directly transmit the torque from the transmission mechanism 70 to the front differential mechanism 14 without providing such a reduction gear mechanism.

The torque converter 60 is arranged between the engine 12 and the transmission mechanism 70 and comprises a pump impeller 63 receiving the torque from the engine 12, a turbine runner 64 outputting the torque to the transmission mechanism 70, a stator 66 that changes the direction of oil flow, and a lock-up clutch 67 that directly connects the pump impeller 63 with the turbine runner 64, whereby the torque can be transmitted through the oil.

The pump impeller 63 is connected to the crankshaft 24 of the engine 12. The pump impeller 63 is designed to be rotated integrally with the crankshaft 24 by the torque of the engine 12.

The turbine runner 64 is connected to the turbine shaft 62 which is in turn connected to the transmission mechanism 70. The turbine shaft 62 is directly connected to the input shaft 71 of the transmission mechanism 70. The turbine runner 64 is rotated by the flow of the oil pushed out by the rotation of the pump impeller 63 and is adapted to output the rotation of the crankshaft 24 of the engine 12 to the transmission mechanism 70 through the turbine shaft 62.

The stator 66 is rotatably supported through a one-way clutch 65 on a housing 31 of the automatic transmission 13 constituting a non-rotating member. The stator 66 serves to change the direction of the oil flow that flows out from the turbine runner 64 and flows into the pump impeller 63 again to generate a force to turn the pump impeller 63. The stator 66 is prevented from rotating by the one-way clutch 65 so as to change the direction of the oil flow.

The stator 66 idles away, when the pump impeller 63 and the turbine runner 64 come to rotate at almost the same rotation speed, to prevent a reverse torque from acting on the turbine runner 64.

The lock-up clutch 67 directly connects the pump impeller 63 and the turbine runner 64 together to have the rotation of the crankshaft 24 of engine 12 mechanically transmitted directly to the turbine shaft 62.

Here, the torque converter 60 is adapted to transmit the torque through the oil between the pump impeller 63 and the turbine runner 64. Therefore, the rotation of the pump impeller 63 cannot transmit 100% of the torque to the turbine runner 64. For this reason, when the rotation speeds of the turbine shaft 62 and the crankshaft 24 become close to each other, the lockup clutch 67 is operated to mechanically connect the pump impeller 63 and the turbine runner 64 directly, more particularly, to mechanically connect the crankshaft 24 to the turbine shaft 62 directly for more efficient transmission from the engine 12 to the transmission mechanism 70, thereby improving fuel economy.

The lock-up clutch 67 is constructed to allow flex lock-up causing a slip at a predetermined slip ratio to be realized. The state of the lock-up clutch 67 is adapted to be selected by the CPU of the ECU 100 in response to the running condition of the vehicle 10, more specifically, the vehicle speed V and the accelerator opening degree Acc, based on the lock-up control map stored in the ROM of the ECU 100. The state of the lock-up clutch 67 can assume, as described above, any one of a converter state where the lock-up clutch 67 is released, a lock-up state where the lock-up clutch 67 is coupled, and a flex lock-up state where the lock-up clutch 67 is slipping.

In addition, the pump impeller 63 is provided with an oil pump 68 of mechanical type for generating hydraulic pressure used for performing the transmission action of the transmission mechanism 70 and for supplying the oil to activate, lubricate, and cool parts and elements of the transmission mechanism 70.

The transmission mechanism 70 comprises the input shaft 71, the output gear 72, a first planetary gear 73, a second planetary gear 74, a C1 clutch 75, a C2 clutch 76, a B1 brake 77, a B2 brake 78, a B3 brake 79, and an F one-way clutch 80.

The input shaft 71 is directly connected to the turbine shaft 62 of the torque converter 60 so that the input shaft 71 can directly receives the rotation output of the torque converter 60. The output gear 72 is connected with a carrier of the second planetary gear 74 and is held in engagement with a later described differential ring gear 42 of the front differential mechanism 14 so that the output gear 72 can function as a counter drive gear. This means that the output gear 72 is adapted to transmit the rotation output of the transmission mechanism 70 to the front differential mechanism 14.

The first planetary gear 73 is constituted by a single pinion type of planetary gear mechanism. The first planetary gear 73 comprises a sun gear S1, a ring gear R1, a pinion gear P1, and a carrier CA1.

The sun gear S1 is coupled to the input shaft 71. The sun gear S1 is connected to the turbine shaft 62 of the torque converter 60 through the input shaft 71. The ring gear R1 is selectively fixed to the housing 31 of the automatic transmission 13 through the B3 brake 79.

The pinion gear P1 is rotatably supported by the carrier CA1. The pinion gear P1 is held in mesh with the sun gear S1 and the ring gear R1. The carrier CA1 is selectively fixed to the housing 31 of the automatic transmission 13 through the B1 brake 77.

The second planetary gear 74 is constituted by a ravigneaux type of planetary gear mechanism. The second planetary gear 74 comprises a sun gear S2, ring gears R2, R3, a short pinion gear P2, a long pinion gear P3, a sun gear S3, a carrier CA2, and a carrier CA3.

The sun gear S2 is connected with the carrier CA1 of the first planetary gear 73. The ring gears R2, R3 are selectively connected to the input shaft 71 through the C2 clutch 76. The ring gears R2, R3 are also selectively fixed to the housing 31 through the B2 brake 78. Further, the ring gears R2, R3 are prevented from rotating in a rotation direction opposite to the rotation direction of the input shaft 71 by the F one-way clutch 80 provided in parallel with the B2 brake 78.

The short pinion gear P2 is rotatably supported by the carrier CA2. The short pinion gear P2 is held in mesh with the sun gear S2 and the long pinion gear P3. The long pinion gear P3 is rotatably supported by the carrier CA3. The long pinion gear P3 is held in mesh with the short pinion gear P2, the sun gear S3, and the ring gears R2, R3.

The sun gear S3 is selectively connected with the input shaft 71 through the C1 clutch 75. The carrier CA2 is connected with the output gear 72. The carrier CA3 is connected to the carrier CA2 and the output gear 72.

Furthermore, the B1 brake 77, the B2 brake 78, and the B3 brake 79 are fixed to the housing 31 of the automatic transmission housing 13. The C1 clutch 75, the C2 clutch 76, the F one-way clutch 80, the B1 brake 77, the B2 brake 78, and the B3 brake 79 (hereinafter simply referred to as clutch C and brake B, respectively, as long as the above clutches and brakes are not necessary to be distinguished particularly) are each constituted by a hydraulic type of friction engagement device having a multi-plate type of clutch or brake hydraulically activated and controlled by a hydraulic actuator. The clutch C and the brake B are adapted to assume the engagement state from the disengagement state and vice versa through the hydraulic circuit that is changed by the energization or de-energization of the linear solenoid valves SL1 to SL5, SLU, and SLT, and the on-off solenoid valve SL of the hydraulic control device 110 and by the operation of the manual valve not shown.

Next, the transmission mechanism 70 of the automatic transmission 13 in the present embodiment will be explained hereinafter with reference to the operating table shown in FIG. 5 focusing on the engagement state of the frictional engagement elements to realize each of the speed change stages.

As shown in FIG. 5, the operating table to be used for realizing each of the speed change stages shows the engagement and disengagement states to be assumed by each of the frictional engagement elements of the transmission mechanism 70, i.e., the clutch C and the brake B to realize each of the speed change stages. In FIG. 5, the mark "o" (circle) is representative of the engagement, and the mark "x" (cross) is representative of the disengagement. The mark "⊚" (double circle) is representative of the engagement only at the time of applying an engine brake, and the mark "Δ" (triangle) is representative of the engagement at the time of start driving the vehicle 10.

In accordance with the combination of the engagement and disengagement shown in the operating table, each of the frictional engagement elements are operated by the energization and de-energization or the electric current control of the linear solenoid valves SL1 to SL5 provided in the hydraulic control device 110 (see FIG. 1) and the transmission solenoids not shown to establish the first to sixth speed change stages of the forward speed change stages and the rearward speed change stage.

In accordance with the operating table, for example, in the event of realizing the first speed change stage, the ECU 100 is operated to engage the F one-way clutch 80 in addition to the engagement of the C1 clutch 75 at the time of start driving the vehicle 10. Further, the ECU 100 is operated to engage the B2 brake 78 in addition to the engagement of the C1 clutch 75 at the time of applying the engine brake in the event of realizing the first speed change stage.

To realize the rearward speed change stage, the ECU 100 is operated to engage the B2 brake 78 and the B3 brake 79. Further, for realizing the neutral range and the parking range, the ECU 100 is operated to disengage all of the C1 clutch 75, the C2 clutch 76, the B1 brake 77, the B2 brake 78, the B3 brake 79, and the F one-way clutch 80. The disengagement of all of the frictional engagement elements of the transmission mechanism 70 causes the neutral state in which no torque transmission between the input side and the output side is established.

Next, the function about each of the solenoid valves of the hydraulic control device 110 will be explained hereinafter. The linear solenoid valve SLT is adapted to perform the hydraulic control of the line pressure PL serving as an original hydraulic pressure of the oil to be supplied to the parts and the elements. More specifically, the linear solenoid valve SLT is controlled by the ECU 100 to adjust the line pressure PL based on the throttle opening degree θth, an intake air amount Qar of the engine 12, a temperature Tw of the cooling water of the engine 12, the engine rotation speed Ne, the rotation speed Nm of the input shaft, viz., the turbine rotation speed Nt, a temperature Tf of the oil in the automatic transmission 13 and the hydraulic control device 110, a shift position Psh, shift ranges, and other factors.

The linear solenoid valve SLU is adapted to perform the control of the lock-up in the torque converter 60. More specifically, the linear solenoid valve SLU is controlled by the ECU 100 based on the engine rotation speed Ne indicative of the input rotation speed of the torque converter 60, the turbine rotation speed Nt indicative of the output rotation speed of the torque converter 60, the throttle opening degree θth, the vehicle speed V, the input torque, and the like to adjust the pressure of a lock-up relay valve and a lock-up control valve not shown in the drawings to control the lock-up clutch 67. The on-off solenoid valve SL is adapted to perform the changing operation of the hydraulic pressure of the lock-up relay valve.

The linear solenoid valves SL1 to SL5 serve to perform the speed change control. The linear solenoid valves SL1 and SL2 function to hydraulically control the C1 clutch 75 and the C2 clutch 76, respectively. The linear solenoid valves SL3, SL4 and SL5 are adapted to hydraulically control the B1 brake 77, the B2 brake 78, and the B3 brake 79, respectively.

The constructions of the front differential mechanism 14 and the transfer 16 in the present embodiment will be explained hereinafter with reference to the schematic block diagram shown in FIG. 6.

Figure 6:
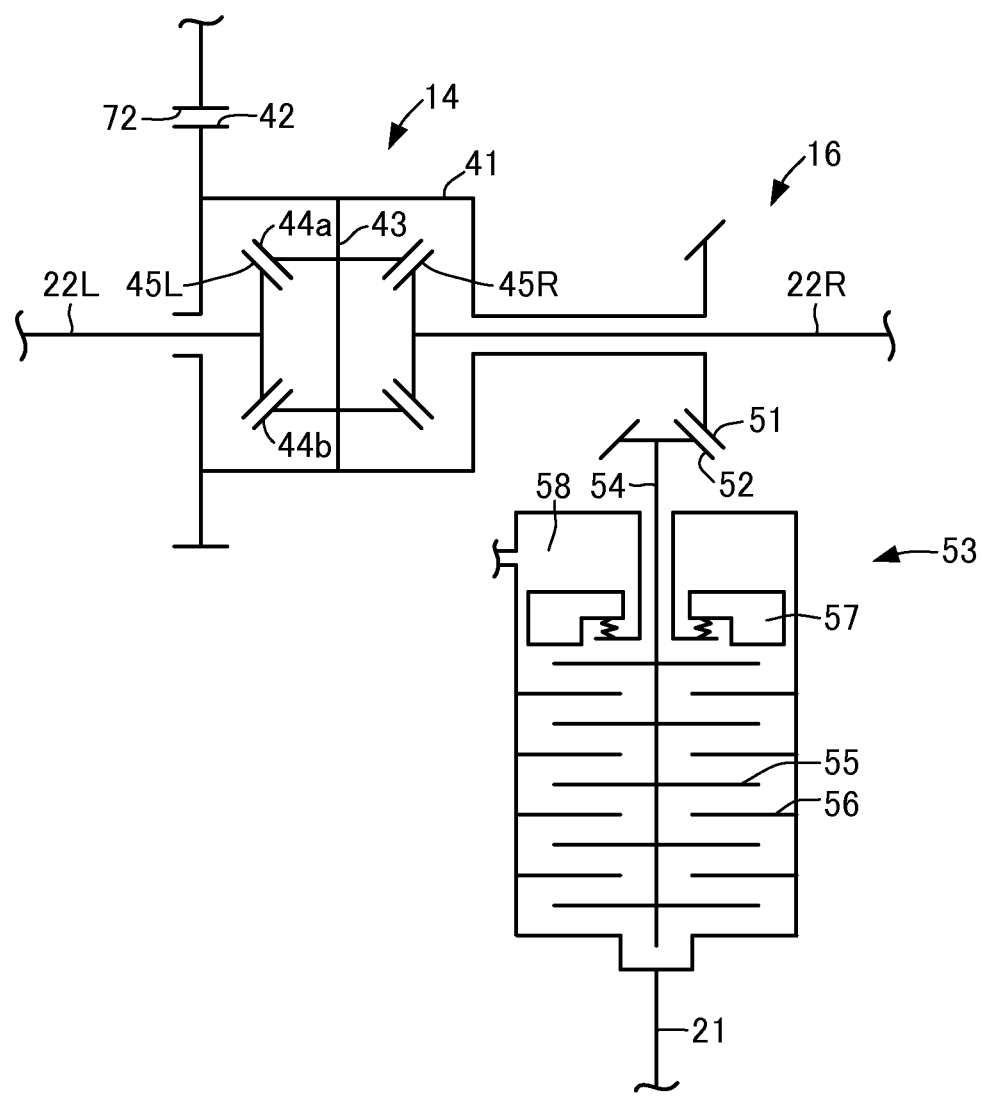
FIG. 6 is a schematic block diagram representing the construction of a front differential mechanism and the construction of a transfer according to the embodiment of the invention.

As shown in FIG. 6, the front differential mechanism 14 comprises a hollow diff case 41, a differential ring gear 42 provided on the outer peripheral portion of the diff case 41, a pinion shaft 43 provided inside the diff case 41, diff pinion gears 44a, 44b, and side gears 45L, 45R. Further, the diff pinion gears 44a, 44b, and the side gears 45L, 45R are each constituted by a bevel gear.

The diff case 41 is rotatably supported on and around the front drive shafts 22L, 22R. The differential ring gear 42 is provided on the outer peripheral portion of the diff case 41 in engagement with the output gear 72 of the automatic transmission 13. The pinion shaft 43 is arranged in parallel with the differential ring gear 42 and secured to the diff case 41 so that the pinion shaft 43 is rotated integrally with the diff case 41.

The diff pinion gears 44a, 44b are rotatably supported on and around the pinion shaft 43. The side gear 45L is mounted to rotate integrally with the front drive shaft 22L and is held in mesh engagement with the diff pinion gear 44a and the diff pinion gear 44b. In a similar manner, the side gear 45R is mounted to rotate integrally with the front drive shaft 22R and is held in mesh engagement with the diff pinion gear 44a and the diff pinion gear 44b.

Accordingly, the front differential mechanism 14 is constructed so that the side gear 45L and the side gear 45R rotate equally when the diff pinion gear 44a and the diff pinion gear 44b are not rotated. On the other hand, the side gear 45L and the side gear 45R rotate in opposite directions relative to each other when the diff pinion gears 44a, 44b of the front differential mechanism 14 are rotated. It is therefore understood that the front differential mechanism 14 is constructed to allow the rotational difference between the side gear 45L integrally rotated with the front drive shaft 22L and the side gear 45R integrally rotated with the front drive shaft 22R, thereby making it possible to absorb the rotational difference between the front wheel 17L and the front wheel 17R when the vehicle is travelling on a curved road.

The rear differential mechanism 15 is the same in construction as the front differential mechanism 14, and thus will not be explained hereinafter. The rear differential mechanism 15 has the differential ring gear 42 held in mesh with the pinion gear of the propeller shaft 21 in place of the output gear 72 of the automatic transmission 13. The rear differential mechanism 15 has the left and right side gears rotating integrally with the rear drive shafts 23L, 23R in lieu of the front drive shafts 22L, 22R, respectively.

The transfer 16 comprises a hypoid gear 51, a hypoid pinion 52, and the transfer clutch 53.

The hypoid gear 51 is integrally rotated with the diff case 41 of the front differential mechanism 14 so as to input the torque from the automatic transmission 13 to the transfer 16 through the front differential mechanism 14. The hypoid pinion 52 is constituted the same as the hypoid gear 51 by a gear, for example, a bevel gear to change the rotational direction of the torque at an angle of 90 degrees when transmitting the torque received from the hypoid gear 51.

The transfer clutch 53 comprises the input shaft 54, a multi-plate clutch disc 55, a multi-plate clutch plate 56, and a piston 57, and has a hydraulic servo chamber 58 formed therein. The transfer clutch 53 is constructed to connect the hypoid pinion 52 and the propeller shaft 21 so as to allow the torque to be transmitted between the hypoid pinion 52 and the propeller shaft 21. The transfer clutch 53 itself is constructed by a known wet multi-plate clutch of a hydraulic servo type.

The input shaft 54 is drivably connected with the hypoid pinion 52 to receive the torque from the hypoid pinion 52 and to transmit the torque to the multi-plate clutch disc 55. The multi-plate clutch plate 56 is constructed to transmit the torque to the propeller shaft 21. The multi-clutch disc 55 and the multi-plate clutch plate 56 collectively constitute a multi-plate clutch.

The hydraulic pressure in the hydraulic servo chamber 58 is controlled by the hydraulic control device so that the hydraulic pressure fed into the hydraulic servo chamber 58 causes the piston 57 to press the multi-plate clutch disc 55 and the multi-plate clutch plate 56 at a predetermined pressure, thereby securing the torque transmission of a predetermined amount therebetween by the predetermined pressure.

The transfer 16 is constructed to distribute the driving force of the engine 12 to the front wheels 17L, 17R and the rear wheels 18L, 18R as understood from the foregoing description. This means that the transfer 16 constitutes a driving force distribution device.

Now, the characteristic construction of the ECU 100 of the vehicle 10 in the embodiment according to the present invention will be explained hereinafter.

The ECU 100 is designed to perform the reduction control that reduces the torque output from the engine 12 against the required torque amount. The ECU 100 carries out the reduction control at the time that the depression of the accelerator pedal 212 is detected by the accelerator sensor 142 and the depression of the foot brake pedal 213 is detected by the FB sensor 143, provided that the speed reduction is determined The ECU 100 does not carry out the reduction control if the above condition is not established. This means that the ECU 100 constitutes an output control portion.

The ECU 100 determines the speed reduction of the vehicle 10 by comparing the speed reduction value calculated based on the drive state detected by the respective sensors 131 to 165 with the speed reduction threshold value set to determine the speed reduction. Furthermore, the ECU 100 is adapted to change the speed reduction threshold value in order to determine the speed reduction of the vehicle 10 while the vehicle behavior stabilization control is being carried out.

The ECU 100 is designed to set the speed reduction threshold value based on the speed reduction threshold value map preset. The ECU 100 is also designed to set the speed reduction threshold value based on the speed reduction threshold value calculation formula preset.

The ECU 100 is designed to change the speed reduction threshold value to determine the speed reduction of the vehicle 10 in the event that the vehicle behavior stabilization control that controls the torque output from the engine 12 is being carried out. Furthermore, the ECU 100 is designed to change the speed reduction threshold value to determine the speed reduction of the vehicle 10 in the event that the vehicle behavior control that controls the braking of the front wheels 17L, 17R and the rear wheels 18L, 18R is being carried out. This means that the ECU 100 constitutes a speed reduction determination portion.

Further, the ECU 100 is designed to carry out the vehicle behavior stabilization control that stabilizes the behavior of the vehicle 10 based on the drive state detected by the respective sensors 131 to 165. Here, the ECU 100 carries out the controls of the TRC, anti-skid control system, and the like as the vehicle behavior stabilization control.

For example, in the event of carrying out the TRC, the ECU 100 is designed to determine the slipping of the front wheels 17L, 17R and the rear wheels 18L, 18R from the rotation speeds of the respective wheels NfL, NfR, NrL, and NrR detected by the front wheel speed sensor 161 and the rear wheel speed sensor 162 and to control the torque output from the engine 12 based on the determination of the slipping. This makes the slipping of the front wheels 17L, 17R and the rear wheels 18L, 18R that occurs at the time of starting the vehicle 10 or accelerating the vehicle 10 to be prevented from occurring.

In the event of carrying out an anti-skid control system, in particular, the VSC, the ECU 100 is designed to control the braking of the front wheels 17L, 17R and the rear wheels 18L, 18R of the vehicle 10 by the braking devices 24L, 24R, 25L, and 25R based on the balancing behavior of the vehicle 10 acquired from the rotation speeds of the respective wheels NfL, NfR, NrL, NrR detected by the front wheel speed sensor 161 and the rear wheel speed sensor 162, the steering angle θhd detected by the steering angle sensor 147, the yaw rate ω detected by the yaw rate sensor 148, and the acceleration αr calculated. Accordingly, the ECU 100 maintains the stability of the vehicle 10 at the time of driving through a turn, avoiding an obstacle, and the like. This means that the ECU 100 constitutes a vehicle behavior stabilization control portion.

Next, the operation of the vehicle control process according to the present embodiment will be explained with reference to the flow chart indicated in FIG. 7.

The flow chart shown in FIG. 7 is indicative of the execution content of the program of the vehicle control process to be executed by the CPU of the ECU 100 with the RAM as a work area. The program of the vehicle control process is stored in the ROM of the ECU 100. The vehicle control process is executed by the CPU of the ECU 100 at a predetermined time interval.

As shown in FIG. 7, the ECU 100 initially determines whether or not the non-selection of L4-SW mode is selected (Step S11).

When it is determined that the non-selection of L4-SW mode is not selected, i.e., L4-SW mode is selected (No at Step S11), the ECU 100 finishes the vehicle control process. This is because that the reduction of the torque of the engine 12 is likely to result in hesitation, thereby deteriorating the drivability of the vehicle 10.

On the other hand, when the vehicle is determined by the ECU 100 that the L4-SW mode is not selected (Yes at Step S11), the ECU 100 then determines whether or not both the accelerator and the brake are ON, and finishes the vehicle control process if either one of the accelerator or the brake is not ON (Step S12). More specifically, the ECU 100 is designed to determine whether or not the accelerator opening degree Acc detected by the accelerator sensor 142 is equal to or more than the accelerator pedal depression determination value Acc_tv stored in the ROM. When the ECU 100 determines that the accelerator opening degree Acc is equal to or more than the accelerator pedal depression determination value Acc_tv, the ECU 100 determines that the accelerator pedal 212 is depressed, viz., the accelerator is ON. When, on the other hand, the ECU 100 determines that the accelerator opening degree Acc is less than the accelerator pedal depression determination value Acc_tv, the ECU 100 determines that the accelerator pedal 212 is not depressed, viz., the accelerator is OFF. Further, the ECU 100 determines whether the foot brake pedal 213 is depressed, viz., the brake is ON, or the foot brake pedal 213 is not depressed, viz., the brake is OFF from the detection signal detected by the FB sensor 143.

At the process of determining the depression of both pedals (Step S12), the ECU 100 starts a timer when the state of the accelerator being ON and the brake being ON is determined (Yes at Step S12) to monitor the duration time of the state of both the accelerator and the brake pedals being depressed. When the accelerator is OFF or the brake is OFF (No at Step S12), the ECU 100 clears the duration time of the state of both pedals being depressed and finishes the monitoring.

When the accelerator and the brake are determined to be ON by the ECU 100 (Yes at Step S12), the ECU 100 determines whether or not the duration time of the state of both pedals being depressed is less than a predetermined time. If the duration time of the state of both pedals being depressed is not less than the predetermined time, viz., the duration time of the state of both pedals being depressed is equal to or more than the predetermined time, the ECU 100 finishes the vehicle control process (Step S13).

On the contrary, when the ECU 100 determines that the duration time of the sate of both pedals being depressed is less than the predetermined time (Yes at Step S13), the ECU 100 determines whether or not the vehicle behavior stabilization control is being carried out (Step S14). More specifically, the ECU 100 determines whether or not the TRC or the VSC is in operation. When the TRC or the VSC is operated, viz., the TRC/VSC active mode, it is determined that the vehicle behavior stabilization control is in operation, while it is determined that the vehicle behavior stabilization control is not in operation when the TRC and the VSC are not operated, viz., the TRC/VSC non-active mode.

When it is determined that the vehicle behavior stabilization control is in operation (Yes at Step S14), the ECU 100 sets the speed reduction threshold value for the vehicle behavior stabilization control in operation (Step S15) and, when it is determined that the vehicle behavior stabilization control is not in operation (No at Step S14), the ECU 100 sets a speed reduction threshold value for normal state (Step S16). More specifically, the ECU 100 sets the speed reduction threshold value for the TRC/VSC active mode when the TRC/VSC is in operation and, when the TRC/VSC is in non-operation, sets the speed reduction threshold value for the TRC/VSC non-active mode.

The ECU 100 then carries out the speed reduction determination process (Step S17). When the speed reduction is not determined to be ON, viz., the speed reduction is OFF, the process returns to START. The speed reduction determination process will be described more specifically later.

When the ECU 100 determines that the speed reduction is ON (Yes at Step S17), the ECU 100 carries out the engine output reduction process (Step S18). For example, the ECU 100 rewrites the accelerator opening degree value from the actual accelerator opening degree Acc to the output reducing accelerator opening degree Acn stored in the ROM for use in the output reduction process to reduce the torque of the engine 12, thereby making the torque reduced to a level lower than the engine torque output by the actual accelerator opening degree Ace. Here, the speed of reducing the engine torque, viz., the rate of change from the actual accelerator opening degree Acc to the output reducing accelerator opening degree Acn is set to the rate corresponding to the vehicle speed V, thereby making it possible to make the time it takes to reach the desired reduced engine torque equal.

Then, the ECU 100 determines whether or not the finishing condition of the engine output reduction process is established (Step S19). More specifically, the ECU 100 determines whether or not the brake is OFF or whether or not the state of hysteresis width of the accelerator opening degree exceeding a predetermined hysteresis width being continued for a predetermined period of time. When the ECU 100 determines that the brake is ON and that the hysteresis width of the accelerator opening degree is equal to or less than the predetermined hysteresis width or a predetermined period of time has not elapsed even if the hysteresis width of the accelerator opening exceeds the predetermined hysteresis width, the process is returned to the engine output reduction process (Step S18). Here, the hysteresis width of the accelerator opening degree indicates the difference between the actual accelerator opening degree Acc before the engine output reduction process (Step S18) and the current actual accelerator opening degree Acc detected by the accelerator sensor 142.

When the ECU 100 determines that the finishing condition of the engine output reduction process is established, viz., the brake is OFF or that the state of the hysteresis width of the accelerator opening degree exceeding the predetermined hysteresis width continues for a predetermined period of time (Yes at Step S19), the ECU 100 performs the returning process of the torque of the engine 12 (Step S20) and finishes the vehicle control process. For example, when the accelerator opening degree is rewritten in the engine output reduction process (Step S18), the accelerator opening degree is returned to the actual accelerator opening degree Acc detected by the accelerator sensor 142 to return the torque of the engine 12 to the torque of a normal driving of the vehicle.

Now, the speed reduction determination process (Step S17) will be explained more specifically. As described in the foregoing, the ECU 100 stores in the ROM the speed reduction threshold value map that is set with the speed reduction threshold values corresponding to the accelerator opening degree Acc and the vehicle speed V. The speed reduction threshold value map holds different speed reduction threshold values set for TRC/VSC non-active mode, viz., the TRC and the VSC are not in operation and for TRC/VSC active mode, viz., the TRC or the VSC is in operation.

The TRC is, as described above, to prevent from occurring the slipping of the front wheels 17L, 17R and the rear wheels 18L, 18R that mainly occurs at the time of starting the vehicle 10 or accelerating the vehicle 10. More specifically, the ECU 100 determines the slipping of the front wheels 17L, 17R and the rear wheels 18L, 18R from the rotation speeds of the respective wheels NfL, NfR, NrL, NrR detected by the front wheel speed sensor 161 and the rear wheel speed sensor 162. When any of the front wheels 17L, 17R and the rear wheels 18L, 18R are determined to be slipping, the ECU 100 reduces the torque output from the engine 12.

The VSC is to maintain the stability of the vehicle 10 when driving through a turn, avoiding an obstacle, or the like. In other words, the VSC prevents skidding when the vehicle 10 loses the balance due to entering a corner at an excessive speed or an operation of abrupt steering wheel, exercising an excellent driving stability.

More specifically, the ECU 100 determines whether it is under an understeer condition or under an oversteer condition based on the rotation speeds of the respective wheels NfL, NfR, NrL, NrR detected by the front wheel speed sensor 161 and the rear wheel speed sensor 162, the steering angle θhd detected by the steering angle sensor 147, and the yaw rate ω detected by the yaw rate sensor 148. When it is determined to be under an understeer condition, the ECU 100 reduces the torque output from the engine 12 and applies braking to the rear wheel 18L or the rear wheel 18R on the inner side of a turn by the braking device 25L or the braking device 25R, respectively. Meanwhile, when an oversteer condition is determined, the ECU 100 applies braking to the front wheel 17L or the front wheel 17R on the outer side of the turn by the braking device 24L or the braking device 24R, respectively.

In the speed reduction determination process, the ECU 100 calculates the acceleration αr first. The calculation method of acceleration αr will be described later. The ECU 100 then determines whether the TRC or the VSC is in operation or the TRC and the VSC are not in operation. Then, the ECU 100 sets the speed reduction threshold value in response to whether or not the TRC and the VSC are in operation, and the detection values of the accelerator opening degree Acc and the vehicle speed V. For example, when the accelerator opening degree is at WOT, the ECU 100 acquires the speed reduction threshold value at the vehicle speed V based on the speed reduction threshold value map depicted in FIG. 3, and sets the acquired value as the speed reduction threshold value.

The ECU 100 then compares the acceleration αr calculated with the speed reduction threshold value thus set. The ECU 100 determines that it is not the speed reduction when the acceleration αr is exceeding the speed reduction threshold value, while the ECU 100 determines that it is the speed reduction when the acceleration αr is less than the speed reduction threshold value. Here, in the speed reduction threshold value map as described above, the speed reduction threshold values are different depending on the TRC and the VSC being active or non-active, even if the accelerator opening degree Acc or the vehicle speed V is the same.

Therefore, even if the accelerator opening degree Acc by the operation of the driver is the same, there are occasions where the ECU 100 determines it as the speed reduction and where the ECU 100 determines it as not the speed reduction. More specifically, even when the acceleration αr becomes a smaller value than the speed reduction threshold value in the TRC/VSC non-active mode by the operation of the TRC or the VSC, due to the fact that the speed reduction threshold values in the TRC/VSC active mode are set smaller for the amount that is lowered by the operation of the TRC or the VSC, the speed reduction by the operation of the driver can be accurately determined without determining the speed reduction unnecessarily.

Next, the method of calculating the acceleration αr will be explained below. The ECU 100 first calculates the acceleration αr by the amount of changes in the vehicle speed V. The ECU 100 calculates the vehicle speed V from the front wheel rotation speed NfL or the front wheel rotation speed NfR detected by the front wheel speed sensor 161. The ECU 100 similarly calculates the vehicle speed Vb from the front wheel rotation speed NfLb or the front wheel rotation speed NfRb detected by the front wheel speed sensor 161 at a predetermined time earlier. The ECU 100 stores the calculated vehicle speed Vb in the RAM. The ECU 100 then calculates a vehicle speed difference value Vdef from the range of speed reduction from the currently calculated vehicle speed V and the previously calculated vehicle speed Vb, and then calculates the acceleration αr with the difference in time between the current calculation and the previous calculation. In this manner, the ECU 100 can calculate the acceleration αr.

In the speed reduction determination process above, the ECU 100 may directly determine the speed reduction of the vehicle 10 from a drive wheel speed change value Nddef of the front wheel rotation speed NfL or the front wheel rotation speed NfR detected by the front wheel speed sensor 161 without calculating the acceleration αr. In this case, the ECU 100 stores in the ROM the speed reduction threshold value map that is set with the drive wheel speed change value Nddef corresponding to the vehicle speed V in place of the aforementioned speed reduction threshold value map. The ECU 100 then calculates the drive wheel speed change value Nddef from the front wheel rotation speed NfL or the front wheel rotation speed NfR detected by the front wheel speed sensor 161 and the previous front wheel rotation speed NfLb or the previous front wheel rotation speed NfRb to carry out the speed reduction determination of the vehicle 10 by the speed reduction threshold value set in the speed reduction threshold value map.

As described in the foregoing, when the ECU 100 can obtain the vehicle speed V from the rotation speed of the front wheels 17L, 17R of the drive wheels, the acceleration αr can be easily obtained based on the front wheel rotation speed NfL or the front wheel rotation speed NfR detected by the front wheel speed sensor 161. However, considering the situation where the drive wheel may slip when travelling through a bad road and the like, the following calculating method of the acceleration αr is desirable.

The method of calculating the acceleration αr that can calculate it even if the drive wheel is slipping will be described hereinafter. The method of calculating the acceleration αr by the amount of changes in the wheel speed Vs will be explained first.

The ECU 100 calculates the third fastest rotation speed from the front wheel rotation speed NfL and the front wheel rotation speed NfR detected by the front wheel speed sensor 161 and the rear wheel rotation speed NrL and the rear wheel rotation speed NrR detected by the rear wheel speed sensor 162. Here, the front wheels 17L, 17R or the rear wheels 18L, 18R having the third fastest rotation speed is designated as a target wheel.

Then, the ECU 100 calculates the wheel speed Vs from the rotation speed Ns of the target wheel detected by the front wheel speed sensor 161 or the rear wheel speed sensor 162. The ECU 100 calculates the previous wheel speed Vsb from the previously detected rotation speed Nsb of the target wheel. Further, the ECU 100 calculates the wheel speed difference value Vsdef from the range of speed reduction between the current wheel speed Vs and the previous wheel speed Vsb, and then calculates the acceleration αr with the difference in time between the current calculation and the previous calculation. The ECU 100 can calculate the acceleration αr in this manner.

As a consequence, the fact that the ECU 100 calculates the acceleration αr with the rotation speed Ns of the third fastest wheel allows the acceleration αr to be calculated even when two wheels are slipping or when the drive wheels of two-wheel drive are slipping.

As described above, when the ECU 100 determines the speed reduction of the vehicle 10 using the wheel speed Vs, the ECU 100 can adequately determine the speed reduction even under the situation where the acceleration αr cannot be adequately obtained from the front wheel rotation speed Nf while the vehicle 10 is travelling through a bad road and the like and the front wheels 17L, 17R are slipping. Furthermore, the ECU 100 can obtain the speed of the vehicle 10 by obtaining the wheel speed Vs as above, in place of the vehicle speed V. Accordingly, even when the vehicle speed V is not obtainable, the wheel speed Vs can be used instead of the vehicle speed V, thereby making it possible for the ECU 100, for example, to determine a desired speed reduction threshold value from the speed reduction threshold value map.

As described in the forgoing, the vehicle control apparatus according to the present embodiment is designed to carry out the reduction control under the condition that the speed reduction of the vehicle 10 is determined, and not to carry out the reduction control if the above condition is not established. In addition, when it is determined that the vehicle behavior stabilization control that stabilizes the behavior of the vehicle 10 is being executed, the vehicle control apparatus is adapted to change the speed reduction threshold value to determine the speed reduction of the vehicle 10. This makes it possible to adequately determine the speed reduction of the vehicle 10, whereby the execution and non-execution of the reduction control is changed resulting in the driver's intention being reflected, thereby making it possible to prevent the drivability from being deteriorated even when the drive state of the vehicle 10 is changed by the execution of the vehicle behavior stabilization control.

Further, the vehicle control apparatus according to the present embodiment is constructed to set the speed reduction threshold value in response to the vehicle speed V, thereby making it possible to vary the range of determining the speed reduction to an adequate value in response to the vehicle speed V. Accordingly, the vehicle control apparatus thus constructed can perform the speed reduction determination more adequately than the determination performed with a fixed speed reduction threshold value, thereby enhancing the adequacy in the determination of the execution or non-execution of the reduction control, and thereby making it possible to prevent the drivability from being deteriorated.

Furthermore, the vehicle control apparatus according to the present embodiment is constructed to set the speed reduction threshold value in response to the depression amount of the accelerator pedal 212, thereby making it possible to vary the range of determining the speed reduction to an adequate value in response to the depression amount of the accelerator pedal 212. Accordingly, the vehicle control apparatus thus constructed can perform the speed reduction determination more adequately than the determination performed with a fixed speed reduction threshold value, thereby enhancing the adequacy in the determination of the execution or non-execution of the reduction control, and thereby making it possible to prevent the drivability from being deteriorated.

The fact that the vehicle control apparatus according to the present embodiment is designed to set the speed reduction threshold value based on the speed reduction threshold value map allows the speed reduction determination value to be adequately set in response to the drive state of the vehicle 10. Consequently, this makes it possible to accurately determine the speed reduction, thereby enhancing the adequacy of the determination to execute or not to execute the reduction control, and thereby preventing the drivability from being deteriorated.

Additionally, the vehicle control apparatus according to the present embodiment is designed to set the speed reduction threshold value based on the speed reduction threshold value calculation formula. This makes it possible to easily set the determination value of the speed reduction in response to the drive state of the vehicle 10 without using a large additional memory, thereby allowing the adequate speed reduction determination to be made. Accordingly, the adequacy in determining the execution or non-execution of the reduction control can be enhanced and the deterioration of the drivability can be prevented.

Furthermore, the vehicle control apparatus according to the present embodiment is designed to execute the vehicle behavior stabilization control by controlling the torque output from the engine 12, and to determine the speed reduction of the vehicle 10 by changing the speed reduction threshold value in the event of the vehicle behavior stabilization control being executed. This allows the speed reduction determination to be carried out adequately even when the vehicle behavior stabilization control, such as the TRC which controls the torque output from the engine 12, is being executed, thereby making it possible to prevent the drivability from being deteriorated. Accordingly, even when the vehicle behavior stabilization control is being executed, particularly in the travelling direction of the vehicle 10, viz., the longitudinal direction, the adequacy of the speed reduction determination can be enhanced.

The vehicle control apparatus according to the present embodiment is designed to execute the vehicle behavior stabilization control by controlling the braking of the front wheels 17L, 17R and the rear wheels 18L, 18R of the vehicle 10, and to determine the speed reduction of the vehicle 10 by changing the speed reduction threshold value in the event of the vehicle behavior stabilization control being executed. This allows the speed reduction determination to be carried out adequately even when the vehicle behavior stabilization control such as an anti-skid control system, particularly the VSC which controls the braking of the front wheels 17L, 17R and the rear wheels 18L, 18R is being executed, thereby making it possible to prevent the drivability from being deteriorated. Accordingly, when the vehicle behavior stabilization control is being executed, particularly in the traverse direction of the vehicle 10, the adequacy of the speed reduction determination can be enhanced.

Although the previously mentioned embodiment has been explained about the vehicle 10 with an engine 12 working as a drive source using gasoline as one of fuels, the present invention is not limited to such the vehicle 10 with the engine 12, but can be applied to an electric automotive vehicle having one or more motors as drive sources, a hydrogen automotive vehicle having a drive source of an engine using hydrogen as one of fuels, and a hybrid vehicle using an engine and a motor as a drive source. In this case, the drive source to decrease the torque includes not only the engine 12 but also the motor the driving force of which can be decreased.

While the previously mentioned embodiment having only one ECU has been explained, it is not limited as such and the vehicle control apparatus may be constructed with a plurality of ECUs according to the present invention. For example, the ECU 100 of the present embodiment may be constructed by a plurality of ECUs such as an E-ECU for executing the combustion control of the engine 12, and a T-ECU for executing the transmission control of the automatic transmission 13. In this case, each of the above ECUs can communicate necessary information with one another.

As will be understood from the foregoing description, the vehicle control apparatus according to the present invention allows the execution and non-execution of the reduction control to be switched therebetween with the driver's intention being reflected even when the driving force control or the braking control is being executed by the vehicle behavior stabilization control that stabilizes the behavior of the vehicle 10. Therefore, the vehicle control apparatus according to the present invention has an advantageous effect of preventing the drivability from being deteriorated and is useful as a vehicle control apparatus to perform the reduction control of the output of the drive source.

EXPLANATION OF REFERENCE NUMERALS

10: vehicle
12: engine (drive source)
13: automatic transmission
14: front differential mechanism
15: rear differential mechanism
16: transfer
17L, 17R: front wheel
18L, 18R: rear wheel
21: propeller shaft
22L, 22R: front drive shaft
23L, 23R: rear drive shaft
24L, 24R, 25L, 25R: braking device (braking unit)
41: diff case
53: transfer clutch
100: ECU (output control portion, speed reduction determination portion, vehicle behavior stabilization control portion)
110: hydraulic control device
120: operation panel
131: crank sensor
142: accelerator sensor (drive state detection unit, accelerator detection unit)
143: FB sensor (drive state detection unit, brake detection unit)
145: throttle sensor
147: steering angle sensor
148: yaw rate sensor
161: front wheel speed sensor (drive state detection unit, vehicle speed detection unit, wheel rotation speed detection unit)
162: rear wheel speed sensor (drive state detection unit, wheel rotation speed detection unit)
163: transfer input speed sensor
164: transfer output speed sensor
165: distribution SW sensor
212: accelerator pedal
213: foot brake pedal
215: power changing switch

What is claimed is:

1. A vehicle control apparatus for a vehicle provided with a drive source, an accelerator pedal, and a brake pedal, the vehicle control apparatus comprising:

a drive state detection unit that detects a drive state of the vehicle including a driving force required amount of driving force output from the drive source;

an output control portion that executes a reduction control of reducing the driving force output from the drive source with respect to the driving force required amount;

a speed reduction determination portion that determines speed reduction of the vehicle by comparing a speed reduction value calculated based on the drive state detected by the drive state detection unit with a speed reduction threshold value set for determining the speed reduction; and a vehicle behavior stabilization control portion that executes a vehicle behavior stabilization control of stabilizing behavior of the vehicle based on the drive state detected by the drive state detection unit, in which the drive state detection unit includes an accelerator detection unit that detects depression of the accelerator pedal, and a brake detection unit that detects depression of the brake pedal, the speed reduction determination portion is operative to change the speed reduction threshold value to determine the speed reduction of the vehicle when the vehicle behavior stabilization control is being executed by the vehicle behavior stabilization control portion, and the output control portion is operative to execute the reduction control under a condition in that the speed reduction is determined by the speed reduction determination portion when the depression of the accelerator pedal is detected by the accelerator detection unit and the depression of the brake pedal is detected by the brake detection unit, and the output control portion is operative not to execute the reduction control under a condition in that the speed reduction is not determined by the speed reduction determination portion when the depression of the accelerator pedal is detected by the accelerator detection unit and the depression of the brake pedal is detected by the brake detection unit.

2. The vehicle control apparatus set forth in claim 1, in which
the drive state detection unit includes a vehicle speed detection unit that detects a vehicle speed, and
the speed reduction determination portion is operative to set the speed reduction threshold value in response to the vehicle speed detected by the vehicle speed detection unit.

3. The vehicle control apparatus set forth in claim 2, in which
the drive state detection unit includes a wheel rotation speed detection unit that detects a rotation speed of each of wheels of the vehicle,
the vehicle behavior stabilization control portion is operative to execute the vehicle behavior stabilization control by determining a slip of wheel from the rotation speed of each of the wheels detected by the wheel rotation speed detection unit and by controlling the driving force output from the drive source based on the determination of the slip, and
the speed reduction determination portion is operative to change the speed reduction threshold value to determine the speed reduction of the vehicle when the vehicle behavior stabilization control that controls the driving force output from the drive source is being executed by the vehicle behavior stabilization control portion.

4. The vehicle control apparatus set forth in claim 3, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

5. The vehicle control apparatus set forth in claim 2, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

6. The vehicle control apparatus set forth in claim 2, in which
the accelerator detection unit is operative to detect a depression amount of the accelerator pedal, and
the speed reduction determination portion is operative to set the speed reduction threshold value in response to the depression amount of the accelerator pedal detected by the accelerator detection unit.

7. The vehicle control apparatus set forth in claim 6, in which
the drive state detection unit includes a wheel rotation speed detection unit that detects a rotation speed of each of wheels of the vehicle,
the vehicle behavior stabilization control portion is operative to execute the vehicle behavior stabilization control by determining a slip of wheel from the rotation speed of each of the wheels detected by the wheel rotation speed detection unit and by controlling the driving force output from the drive source based on the determination of the slip, and
the speed reduction determination portion is operative to change the speed reduction threshold value to determine the speed reduction of the vehicle when the vehicle behavior stabilization control that controls the driving force output from the drive source is being executed by the vehicle behavior stabilization control portion.

8. The vehicle control apparatus set forth in claim 7, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

9. The vehicle control apparatus set forth in claim 6, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

10. The vehicle control apparatus set forth in claim 1, in which
the accelerator detection unit is operative to detect a depression amount of the accelerator pedal, and
the speed reduction determination portion is operative to set the speed reduction threshold value in response to the depression amount of the accelerator pedal detected by the accelerator detection unit.

11. The vehicle control apparatus set forth in claim 10, in which
the drive state detection unit includes a wheel rotation speed detection unit that detects a rotation speed of each of wheels of the vehicle,
the vehicle behavior stabilization control portion is operative to execute the vehicle behavior stabilization control by determining a slip of wheel from the rotation speed of each of the wheels detected by the wheel rotation speed detection unit and by controlling the driving force output from the drive source based on the determination of the slip, and
the speed reduction determination portion is operative to change the speed reduction threshold value to determine the speed reduction of the vehicle when the vehicle behavior stabilization control that controls the driving force output from the drive source is being executed by the vehicle behavior stabilization control portion.

12. The vehicle control apparatus set forth in claim 11, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

13. The vehicle control apparatus set forth in claim 10, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

14. The vehicle control apparatus set forth in claim 1, in which
the speed reduction determination portion is operative to set the speed reduction threshold value based on a speed reduction threshold value map preset.

15. The vehicle control apparatus set forth in claim 1, in which
the speed reduction determination portion is operative to set the speed reduction threshold value based on a speed reduction threshold value calculation formula preset.

16. The vehicle control apparatus set forth in claim 1, in which
the drive state detection unit includes a wheel rotation speed detection unit that detects a rotation speed of each of wheels of the vehicle,
the vehicle behavior stabilization control portion is operative to execute the vehicle behavior stabilization control by determining a slip of wheel from the rotation speed of each of the wheels detected by the wheel rotation speed detection unit and by controlling the driving force output from the drive source based on the determination of the slip, and
the speed reduction determination portion is operative to change the speed reduction threshold value to determine the speed reduction of the vehicle when the vehicle behavior stabilization control that controls the driving force output from the drive source is being executed by the vehicle behavior stabilization control portion.

17. The vehicle control apparatus set forth in claim 16, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

18. The vehicle control apparatus set forth in claim 1, further comprising a braking unit that applies braking on each of wheels of the vehicle, wherein
the drive state detection unit includes a vehicle balance detection portion that detects balancing behavior of the vehicle,
the vehicle behavior stabilization control portion is operative to execute the vehicle behavior stabilization control by controlling the braking on each of the wheels of the vehicle by the braking unit based on the balancing behavior of the vehicle detected by the vehicle balance detection portion, and
the speed reduction determination portion is operative to change the speed reduction threshold value to determine the speed reduction of the vehicle when the vehicle behavior stabilization control that controls the braking on each of the wheels is being executed by the vehicle behavior stabilization control portion.

* * * * *